United States Patent
Biecker et al.

(10) Patent No.: US 9,822,234 B2
(45) Date of Patent: Nov. 21, 2017

(54) THIXOTROPY-INCREASING ADDITIVE AND COMPOSITION CONTAINING SAID ADDITIVE

(71) Applicant: BYK-Chemie, GmbH, Wesel (DE)

(72) Inventors: Christian Biecker, Hünxe (DE); Sascha Kockoth, Stuttgart (DE); Frederik Piestert, Wesel (DE); Wolfgang Pritschins, Wesel (DE); Jürgen Omeis, Dorsten-Lembeck (DE); Eva Besten, Wesel (DE); Angelika Orlowski, Wesel (DE)

(73) Assignee: BYK-Chemie, GmbH, Wesel (DE)

( * ) Notice: Subject to any disclaimer, the term of this patent is extended or adjusted under 35 U.S.C. 154(b) by 225 days.

(21) Appl. No.: 14/773,606

(22) PCT Filed: Mar. 11, 2014

(86) PCT No.: PCT/EP2014/054644
§ 371 (c)(1),
(2) Date: Sep. 8, 2015

(87) PCT Pub. No.: WO2014/139982
PCT Pub. Date: Sep. 18, 2014

(65) Prior Publication Data
US 2016/0032077 A1 Feb. 4, 2016

(30) Foreign Application Priority Data
Mar. 11, 2013 (EP) .................................. 13158671

(51) Int. Cl.
| | | |
|---|---|---|
| C08K 3/36 | (2006.01) | |
| C08K 5/3442 | (2006.01) | |
| C08K 5/3445 | (2006.01) | |
| C08K 5/3462 | (2006.01) | |
| C09D 5/04 | (2006.01) | |
| C08L 33/04 | (2006.01) | |
| C08L 33/08 | (2006.01) | |
| C08L 63/00 | (2006.01) | |
| C08L 77/08 | (2006.01) | |
| C09D 177/08 | (2006.01) | |
| C09J 177/08 | (2006.01) | |

(52) U.S. Cl.
CPC ............... *C08K 3/36* (2013.01); *C08L 33/04* (2013.01); *C08L 33/08* (2013.01); *C08L 63/00* (2013.01); *C08L 77/08* (2013.01); *C09D 5/04* (2013.01); *C09D 177/08* (2013.01); *C09J 177/08* (2013.01)

(58) Field of Classification Search
CPC ... C08K 3/36; C08K 5/00; C08K 5/20; C08K 5/3445; C08K 5/3462; C08K 9/04; C08K 9/06; C08K 2201/00
USPC ........ 523/443, 461, 466; 524/100, 106, 186, 524/210, 217, 227, 230, 531, 492
See application file for complete search history.

(56) References Cited

U.S. PATENT DOCUMENTS

| | | | |
|---|---|---|---|
| 2,793,219 A | 5/1957 | Barrett et al. | |
| 2,955,121 A | 10/1960 | Myers et al. | |
| 3,897,468 A | 7/1975 | Mains et al. | |
| 3,898,144 A * | 8/1975 | Rudolph | C08F 299/0421 522/107 |
| 4,066,587 A * | 1/1978 | Mains | C08L 67/02 525/420.5 |
| 4,146,520 A | 3/1979 | Bierwirth et al. | |
| 4,247,426 A | 1/1981 | Hinze et al. | |
| 4,440,900 A | 4/1984 | Burba et al. | |
| 4,533,524 A | 8/1985 | Burba et al. | |
| 4,673,710 A | 6/1987 | Burba et al. | |
| 4,828,722 A * | 5/1989 | Steltenkamp | C11D 1/40 510/322 |
| 4,857,111 A | 8/1989 | Haubennestel et al. | |
| 5,081,168 A * | 1/1992 | Edwards | C08G 59/5073 523/466 |
| 5,130,463 A | 7/1992 | Haubennestel et al. | |
| 5,143,952 A | 9/1992 | Saheki et al. | |
| 6,043,300 A | 3/2000 | Santhanam | |
| 6,077,886 A | 6/2000 | Hayes et al. | |
| 6,111,054 A | 8/2000 | Haubennestel et al. | |
| 6,630,541 B1 | 10/2003 | Bakker et al. | |
| 8,293,863 B2 | 10/2012 | Vedage et al. | |
| 2007/0055001 A1 | 3/2007 | Geurtsen et al. | |
| 2007/0287808 A1* | 12/2007 | Vedage | C08G 59/54 525/423 |
| 2007/0287809 A1 | 12/2007 | Vedage et al. | |
| 2010/0323112 A1 | 12/2010 | Rick et al. | |
| 2012/0237774 A1 | 9/2012 | Raymond et al. | |
| 2013/0261255 A1 | 10/2013 | Deyrail et al. | |

FOREIGN PATENT DOCUMENTS

| | | |
|---|---|---|
| CN | 101466539 A | 6/2009 |
| CN | 102428147 A | 4/2012 |

(Continued)

OTHER PUBLICATIONS

Translated abstract of JP 58-122936 A (no date).*

(Continued)

*Primary Examiner* — Michael J Feely
(74) *Attorney, Agent, or Firm* — Curatolo Sidoti Co., LPA; Joseph G. Curatolo; Salvatore A. Sidoti

(57) ABSTRACT

The invention relates to a use of at least one condensation product (A) in the form of the free compound or in the form of a salt of at least one acid as a thixotropy-increasing additive, which condensation product can be obtained by reacting at least one polymerized fatty acid or at least one reaction product (U) of at least two polymerized fatty acids and at least one polyamine having at least two primary amino groups as component (a1) with at least one polyalkylene polyamine, which is capable of forming at least one imidazoline and/or tetrahydropyrimidine unit and which has at least two primary amino groups or at least one primary and at least one secondary amino group, a composition containing at least one such condensation product (A) and at least one thixotropic agent (B), and a use of said composition, which additionally comprises at least one binder (C), as an adhesive, sealant, paint, coating agent, adhesive resin, casting resin, artificial marble, floor covering, polymer concrete, or fiber composite material.

11 Claims, No Drawings

(56) References Cited

FOREIGN PATENT DOCUMENTS

| | | |
|---|---|---|
| DE | 25 06 211 A1 | 8/1975 |
| DE | 26 54 871 A1 | 6/1978 |
| DE | 37 06 860 A1 | 9/1988 |
| EP | 0 003 246 A1 | 8/1979 |
| EP | 0 084 111 A1 | 7/1983 |
| EP | 0 098 372 A1 | 1/1984 |
| EP | 0 417 490 A2 | 3/1991 |
| EP | 0 835 910 A1 | 4/1998 |
| EP | 0 893 155 A2 | 7/1998 |
| EP | 0938254 A1 | 8/1999 |
| EP | 1 865 013 A1 | 12/2007 |
| GB | 1252282 A | 11/1971 |
| JP | 58-122936 A * | 7/1983 .............. C08K 3/22 |
| WO | WO 99/23177 A1 | 5/1999 |

OTHER PUBLICATIONS

PCT/EP2014/054644—International Search Report, dated Apr. 1, 2014.
PCT/EP2014/054644—International Written Opinion, dated Apr. 1, 2014.
PCT/EP2014/054644—International Preliminary Report on Patentability, dated Sep. 11, 2015.

* cited by examiner

THIXOTROPY-INCREASING ADDITIVE AND COMPOSITION CONTAINING SAID ADDITIVE

CROSS REFERENCE TO RELATED APPLICATIONS

This application is a national stage application of International Application No. PCT/EP2014/054644, filed 11 Mar. 2014, which claims priority from European Patent Application No. 13158671.1, filed 11 Mar. 2013, and which are incorporated herein by reference.

The present invention relates to a use of at least one condensation product (A) in the form of the free compound or in the form of a salt of at least one acid as thixotropy-increasing additive, said product being obtainable by reaction of at least one polymerized fatty acid or at least one reaction product (U) of at least two polymerized fatty acids and at least one polyamine having at least two primary amino groups, as component (a1), with at least one polyalkylenepolyamine which is capable of forming at least one imidazoline and/or tetrahydropyrimidine unit and which has at least two primary amino groups or at least one primary and at least one secondary amino group, to a composition comprising at least one such condensation product (A) and at least one thixotropic agent (B), and also to a use of this composition, further comprising at least one binder (C), as adhesive, sealant, paint, coating material, adhesive resin, casting resin, synthetic marble, floor covering, polymer concrete, or fiber composition material.

Particularly within the field of fiber composites, adhesives, sealants, paints, and coating materials, it is necessary to tailor the rheological properties of such compositions. Setting the desired consistency in such compositions is customarily accomplished through appropriate selection of binders, solvents, and the amount of pigments and/or fillers. In many cases, however, setting the desired consistency by means of the aforementioned constituents is not enough. In such cases, the addition of what are called rheological additives is required. Their effect may be a reduction in viscosity to aid workability, or an increase in viscosity, the latter also being referred to as thickening. An increase in viscosity of this kind may be achieved, for example, through the addition of thixotropic agents as thickeners.

For the stated applications, a large number of different organic or inorganic thickeners are described: In aqueous systems, it is primarily cellulose ethers, starch, natural hydrocolloids, synthetic biopolymers, polyacrylate thickeners, associative thickeners based on hydrophobically modified polymers such as polyethers, ether urethanes, polyacrylamides, and alkali-activated acrylate emulsions, or water-swellable inorganic thickeners that are used. Typical thickeners for nonaqueous systems, besides organic thickeners such as waxes and thixotropic resins, are inorganic thickeners such as magnesium oxide and magnesium hydroxide, for example, which are used primarily in unsaturated polyester resin systems, or amorphous silicas and phyllosilicates such as organically modified bentonite. In the aqueous systems, and especially nonaqueous systems, that are to be thickened, these thickeners develop their viscosity-increasing effect immediately after incorporation and/or mixing.

Where, for example, amorphous silica is used as a thixotropic agent in a liquid or dispersion in order to produce a thickening effect within said liquid or dispersion, hydrogen bonds may be formed between the individual silica molecules. This produces a three-dimensional network, thereby possibly reducing the fluidity of the liquid or dispersion. A network of this kind can be destroyed again by exposure to shearing forces, leading in turn to a reduction in viscosity of the liquid or dispersion. After a certain regeneration time, the viscosity of the system climbs again, since the silica molecules present in the liquid or dispersion once again form a three-dimensional network. This time-dependent and reversible process is generally referred to as thixotropy.

The thixotroping effect of thixotropic agents such as amorphous silica, for example, is utilized in order, for example, to prevent the sagging or running of resin solutions, sealing compounds, adhesives, coating materials, filling compounds, and casting resins, but also in order to give a more viscous consistency to mineral oils, for example.

In certain systems, the thixotropic agent used, such as amorphous silica, for example, has a tendency to settle. This is particularly critical if systems of this kind containing thixotropic agent are transported over a relatively long time in containers and so are subject to mechanical loads such as shearing forces occurring. Customarily an attempt is made to counteract this unwanted behavior on the part of the thixotropic agent by increasing the amount of agent used, in order thus to ensure the maintenance of the thixotropic effect, such as the retention of a three-dimensional network, formed by hydrogen bonds between silica molecules, even under at least minor mechanical load. However, increasing the amount used of the thixotropic agent in this way within the respective system often has the disadvantage that too high a concentration can lead to disruptions in certain technical applications of the systems, possibly leading, for example, to unwanted matting effects in the case of lustrously formulated coating systems, or else to a reduction in strength in resin systems. Moreover, such an increase in the amount of thixotropic agent used is particularly deleterious, or is not possible, in systems inherently having a relatively high viscosity. In systems of these kinds in particular, therefore, the amount of thixotropic agent that can be used is greatly limited.

In some systems containing thixotropic agents, such as, for example, in a system which as well as the thixotropic agent such as amorphous silica also comprises an epoxy resin-based binder, and is admixed with a curing component such as an amine, for example, there may be (competing) formation of hydrogen bonds between the amine and the thixotropic agent such as amorphous silica—other words, there may be adsorption of the added curing component to the thixotropic agent. As a result, the three-dimensional network formed beforehand by hydrogen bonds between the individual silica molecules may be at least partly destroyed, and hence, in particular, the thixotroping effect of the thixotropic agent used may be significantly weakened.

One approach which aims to prevent any such at least partial destruction of such networks in systems containing thixotropic agents, and/or aims to boost the thixotroping effect of the thixotropic agent used, lies in the strengthening or stabilizing of the network within the systems through addition of a thixotropy-increasing additive.

Thus, for example, DE 37 06 860 A1 discloses thixotropy-increasing additives based on polyhydroxycarboxamides, which in combination with fumed silica, in solventborne systems, improve the incorporation of the silica and increase and stabilize its thixotropic behavior. These polyhydroxycarboxamides, however, have certain disadvantages in some binder compositions, as for example in epoxy resin-based binders. A disadvantage of the thixotropy-increasing additives known from DE 37 06 860 A1, though, is that their thixotropy-increasing effect is not enough, especially in compositions which are applied at high layer thicknesses, and that where amines are used as a curing component in these compositions, the thixotropy-increasing effect of these additives may be significantly weakened.

Reaction products of an alkyd resin and a poly(ester) amide as thixotropic agents are known from WO 99/23177 A1. The poly(ester)amide here may be obtained by reaction of a polycarboxylic acid with an amine. The amine in that case is necessarily an aromatic amine, i.e., an amine which is not capable of forming imidazoline and/or tetrahydropyrimidine units. WO 99/23177 A1 contains neither any reference to a use of the poly(ester)amide per se as a thixotropic agent, nor to a use of this polymer or of the reaction product as a thixotropy-increasing additive. In accordance with WO 99/23177 A1, a thixotropic effect is provided exclusively by the reaction product of the alkyd resin and the poly(ester) amide.

Moreover, the addition of a high molecular weight polyethyleneimine as thixotropy-increasing additive with a molecular weight of about 750 000 g/mol is described in EP 0 835 910 A1. The usefulness of this thixotropy-increasing additive is confined, however, to epoxy resin-based binder systems. A disadvantage of the high molecular weight polyethyleneimines known from EP 0 835 910 A1, however, is that on account of their high polarity they have a high viscosity and are difficult to process and/or are of only limited or zero compatibility with many customarily employed binders. Moreover, the high molecular weight polyethyleneimines known from EP 0 835 910 A1 are used customarily in the form of an aqueous composition, this, however, being deleterious for the majority of solvent-containing compositions, since water may act catalytically and, especially in the case of polyurethane-based binders, there may be unwanted formation of gas. Furthermore, in polyester-based binders in particular, the storage stability of the high molecular weight polyethyleneimines known from EP 0 835 910 A1 is low.

There is nevertheless a need for thixotropy-increasing additives, especially in combination with a thixotropic agent such as amorphous and more particularly fumed silica, for example, which do not have the above disadvantages of the customarily employed thixotropy-increasing additives.

It is an object of the present invention, therefore, to provide a thixotropy-increasing additive which has advantages over the customarily employed thixotropy-increasing additives. More particularly it is an object of the present invention to provide compositions comprising at least one such thixotropy-increasing additive and also at least one thixotropic agent, these compositions having advantages over the customarily employed compositions, particularly in respect of the thixotroping effect of such compositions, which are used as adhesives, sealants, paints, or coating materials, more particularly as adhesives. More particularly it is an object of the present invention to provide a composition which, in particular on account of the thixotropy-increasing additive it comprises and also on account of the thixotropic agent it comprises, is suitable for enhancing the mechanical properties of the compositions in the uncured, and in the cured, state, especially for increasing their stability.

This object is achieved by a use of at least one condensation product (A) in the form of the free compound or in the form of a salt of at least one acid, the product being obtainable by reaction of (a1)) at least one polymerized fatty acid or at least one reaction product (U) of at least two polymerized fatty acids and at least one polyamine having at least two primary amino groups with (a2) at least one polyalkylenepolyamine which is capable of forming at least one imidazoline and/or tetrahydropyrimidine unit and which has at least two primary amino groups or at least one primary and at least one secondary amino group, as a thixotropy-increasing additive.

Condensation products of polymerized fatty acids and polyamines and their use as curing components and/or as constituents of PVC plastisols are known from, for example, DE 26 54 871 A1, EP 0 084 111 A1, EP 0 098 372 A1, EP 0 003 246 A1, EP 1 865 013 A1, and US 2012/0237774 A1; not known, however, is the use as thixotropy-increasing additives of the condensation products described therein.

A first subject of the present invention, therefore, is a use of at least one above-stated condensation product (A) as a thixotropy-increasing additive. The at least one condensation product (A) is used preferably in combination with at least one thixotropic agent (B), optionally further in combination with at least one binder (C). Suitable thixotropic agents (B) and binders (C) are all thixotropic agents (B) and binders (C) that are stated in connection with the composition of the invention, which is a further subject of the present invention. The condensation product (A) used in accordance with the invention as thixotropy-increasing additive is preferably itself not a thixotropic agent.

It has surprisingly been found that with the condensation product (A) used in accordance with the invention, it is possible to achieve an increase in the thixotropic effect induced by a thixotropic agent (B), especially if the thixotropic agent (B) is an amorphous silica, such as a fumed silica, for example, since in that case the presence of the condensation product (A) leads to a strengthening of the silica network built up by the thixotropic agent (B) in different binders (C). Surprisingly, therefore, the condensation product (A) used in accordance with the invention is suitable as a thixotropy-increasing additive (A), especially in combination with at least one thixotropic agent (B) and optionally at least one binder (C). It has in particular been surprisingly found that by means of such strengthening of the silica network built up by the thixotropic agent (B), it is possible to prevent at least partial destruction of the network under moderate temperature increase and/or moderate mechanical loads. It has further surprisingly been found that through use of the condensation product (A) used in accordance with the invention as a thixotropy-increasing additive, it is possible to reduce the amount of thixotropic agent (B) that need be used in order to achieve at least the same thixotroping effect, thereby making it possible to reduce the incidence of adverse properties associated with a greater amount of thixotropic agent (B) being used, such as, for example, unwanted matting effects in the case of lustrously formulated coating systems, or reduced strength in binders (C). It has further surprisingly been found that through use of the condensation product (A) used in accordance with the invention as a thixotropy-increasing additive, it is possible to exert a positive influence over the settling behavior of the thixotropic agent (B), especially if the thixotropic agent (B) is an amorphous silica, such as a fumed silica, for example.

It has further surprisingly been found that with the condensation product (A) used in accordance with the invention, the thixotropic effect induced by a thixotropic agent (B) can be boosted, especially if compositions comprising these compounds and also at least one binder (C) and optionally, moreover, at least one curing agent (D) are provided that are used as adhesive or sealant, more particularly as adhesive, since at the same time it is possible, as a result, to increase the binding power of the cured adhesive or sealant and so to increase the mechanical stability of the adhesively bonded or sealed assembly. This is especially advantageous where such assemblies are used under high mechanical stress, as in the case, for example, of adhesive bonds of half-shells in the fiber composite sector, such as wings in air travel or rotor blades for wind turbines, which as a result are able to compensate for manufacturing tolerances and to transfer a better force transmission in structural components and consequently to accept a greater energy. More particularly it has surprisingly been found that where the compositions of the invention are used as adhesives or sealants, especially adhesives, they can be applied in layer thicknesses of several millimeters to centimeters to substrates that are to be bonded, such as aforementioned rotor blade components, for example. Especially where adhesives are applied in such layer thicknesses, it is necessary to use adhesives distinguished by sufficiently high viscosity and/or low fluidity, in order to meet the requirements of overhead use or application to a vertical plane without running away. Particularly in the case of substrates requiring adhesive bonding over large surface areas, such as the rotor blade halves of wind turbines, for example, requirements imposed in this respect are correspondingly exacting.

Additionally it has been found that the surprising effects and advantages of the condensation product (A) used in accordance with the invention as a thixotropy-increasing additive, and of compositions comprising this product, are achieved in particular when the condensation product (A) has a tertiary nitrogen content in the range from 0.5 to 20 wt %, based on the total weight of the condensation product (A), such content being a measure of the formation of imidazoline and/or tetrahydropyrimidine units formed in the reaction of component (a1)) with component (a2) in the condensation product (A), with elimination of water. The tertiary nitrogen content is determined preferably by the method described below.

The terms "thixotropy" and "thixotropic agent" are known to the skilled person and defined for example in Rompp Lexikon, Lacke and Druckfarben, Georg Thieme Verlag 1998 and in Rompp Chemie-Lexikon, Georg Thieme Verlag 1992.

Component (a1)

The condensation product (A) used in accordance with the invention as a thixotropy-increasing additive is obtainable, i.e., is obtained, by reaction of at least one component (a1)) with at least one component (a2).

Used as component (a1)) here is at least one polymerized fatty acid or at least one reaction product (U) of at least two polymerized fatty acids and at least one polyamine having at least two primary amino groups. In accordance with the invention, therefore, corresponding polymerized fatty acid derivatives of component (a1)) which can be used for preparing the condensation product (A), such as corresponding polymerized fatty acid esters, for example, are also included. As component (a1)) for preparing the condensation product (A) it is therefore possible to use at least one polymerized fatty acid or at least one polymerized fatty acid derivative such as, for example, at least one polymerized fatty acid ester, or at least one reaction product (U) of at least two polymerized fatty acids or of at least two polymerized fatty acid derivatives such as, for example, at least two polymerized fatty acid esters, and at least one polyamine having at least two primary amino groups.

In one preferred embodiment, use is made as component (a1)) of at least one polymerized fatty acid or at least one polymerized fatty acid derivative such as, for example, at least one polymerized fatty acid ester.

In another preferred embodiment, use is made as component (a1)) of at least one reaction product (U) of at least two polymerized fatty acids or of at least two polymerized fatty acid derivatives such as, for example, at least two polymerized fatty acid esters, and at least one polyamine having at least two primary amino groups.

For preparing the polymerized fatty acid used as component (a1)) or for preparing the reaction product (U) used as component (a1), preference is given to using at least one at least monounsaturated fatty acid, preferably at least one at least monounsaturated aliphatic $C_{16}$-$C_{20}$ monocarboxylic acid.

The term "fatty acid" refers in the sense of the present invention preferably to a saturated or unsaturated, preferably unsaturated, aliphatic $C_{14}$-$C_{22}$ monocarboxylic acid having a total of 14-22, i.e., 14, 15, 16, 17, 18, 19, 20, 21, or 22 carbon atoms, preferably an aliphatic $C_{16}$-$C_{20}$ monocarboxylic acid having a total of 16-20, i.e., 16, 17, 18, 19, or 20 carbon atoms, more particularly an aliphatic $C_{18}$ monocarboxylic acid having a total of 18 carbon atoms, and having in each case precisely one —C(=O)—OH group, i.e., a fatty acid which as well as this one —C(=O)—OH group has a $C_{13}$-$C_{21}$ aliphatic radical having a total of 13-21, i.e., 13, 14, 15, 16, 17, 18, 19, 20, or 21 carbon atoms, preferably a $C_{15}$-$C_{19}$ aliphatic radical having a total of 15-19, i.e., 15, 16, 17, 18, or 19 carbon atoms, and more particularly a $C_{17}$ aliphatic radical having a total of 17 carbon atoms. The expression "aliphatic" here embraces preferably acyclic saturated or unsaturated, preferably unsaturated, branched or unbranched aliphatic radicals. Unsaturated aliphatic radicals here have at least one, preferably 1, 2, 3, 4, or 5, more preferably 1, 2, 3, or 4, very preferably 1, 2, or 3 carbon double bond(s). The fatty acids may be natural or synthetically produced fatty acids. Preference is given to aliphatic $C_{14}$-$C_{22}$ monocarboxylic acids selected from the group consisting of myristic acid, pentadecanoic acid, palmitic acid, margaric acid, stearic acid, nonadecanoic acid, arachidic acid, henicosanoic acid, docosanoic acid, myristoleic acid, palmitoleic acid, petroselinic acid, oleic acid, elaidic acid, vaccenic acid, gadoleic acid, icosenoic acid, cetoleic acid, erucasic acid, linoleic acid, linolenic acid, calendic acid, punicic acid, eleostearic acid, arachidonic acid, timnodonic acid, clupanodonic acid, and cervonic acid. Preference is given to aliphatic $C_{16}$-$C_{20}$ monocarboxylic acids selected from the group consisting of palmitic acid, margaric acid, stearic acid, nonadecanoic acid, arachidic acid, palmitoleic acid, petroselinic acid, oleic acid, elaidic acid, vaccenic acid, gadoleic acid, icosenoic acid, linoleic acid, linolenic acid, calendic acid, punicic acid, eleostearic acid, arachidonic acid, and timnodonic acid. Preference is given to aliphatic $C_{18}$ monocarboxylic acids selected from the group consisting of stearic acid, petroselinic acid, oleic acid, elaidic acid, vaccenic acid, linoleic acid, linolenic acid, calendic acid, punicic acid, and eleostearic acid, more particularly selected from the group consisting of stearic acid, oleic acid, linoleic acid, and linolenic acid, most preferably selected from the group consisting of oleic acid, linoleic acid, and linolenic acid. Most preferred are aliphatic $C_{18}$ monocarboxylic acids selected from the group consisting of oleic acid and linoleic acid. These two fatty acids are readily available and comparatively easy to polymerize. Mixtures of oleic acid and linoleic acid occur, for example, in tall oil fatty acids, which are a commercial source of these fatty acids.

The term "fatty acid", especially in connection with the term "polymerized fatty acid", encompasses, in the sense of the present invention, preferably fatty acid derivatives as well, such as corresponding fatty acid esters and/or salts of these fatty acids, for example.

The term "polymerized fatty acid" in the sense of the present invention refers preferably to a dimerized and/or a trimerized fatty acid. Dimerized and trimerized fatty acids are available commercially. Examples of commercial dimerized fatty acids are the products Empol 1003, Empol 1005, Empol 1008 (hydrogenated), Empol 1012 (hydrogenated), Empol 1016, Empol 1026, Empol 1028, Empol 1061, Empol 1062, Pripol 1006 (hydrogenated), Pripol 1009 (hydrogenated), Pripol 1012, Pripol 1013, Pripol 1017, Pripol 1022, Pripol 1025 (hydrogenated), Pripol 1027 from Croda, and, for commercial trimerized fatty acids, the products Empol 1043 from BASF and Pripol 1040 from Croda.

In one preferred embodiment of the present invention, the polymerized fatty acid used as component (a1)) or the reaction product (U) used as component (a1)) is prepared using aliphatic, at least monounsaturated $C_{14}$-$C_{22}$ monocarboxylic acids, preferably at least monounsaturated $C_{16}$-$C_{20}$ monocarboxylic acids, more preferably at least monounsaturated $C_{18}$ monocarboxylic acids.

The fatty acids used for preparing component (a1)) preferably have an acid number of 100 to 350 mg KOH per g fatty acid, more preferably of 125 to 300 mg KOH per g fatty acid, very preferably of 150 to 250 mg KOH per g fatty acid.

The skilled person knows of methods for determining the acid number, such as the titration of a solution of a fatty acid whose acid number is to be ascertained with a KOH solution against an indicator such as phenolphthalein.

At least monounsaturated fatty acids are used as starting material for preparing component (a1). The skilled person knows of preparation processes for the provision of polymerized fatty acids, such as of dimerized, trimerized, and more highly polymerized fatty acids. Polymerized fatty acids may be prepared, for example, by a radical mechanism as described in DE 25 06 211 A1, or by polymerization of unsaturated fatty acids and subsequent distillation techniques for the removal of unreacted fatty acids, i.e., unreacted aliphatic monocarboxylic acids, from dimerized, trimerized, and more highly polymerized fatty acids. Polymerization reactions of these kinds are known to the skilled person and are described in, for example, U.S. Pat. No. 2,793,219 A and U.S. Pat. No. 2,955,121 A. The dimerized and trimerized fatty acids obtained may in each case be separated analogously by means of distillation from one another and, moreover, in each case from higher fatty acids, and may be subjected, optionally, to further conversion reactions such as hydrogenations, for example. Through such hydrogenation reactions, the polymerized—for example trimerized or dimerized—fatty acids may be saturated, as a result of which the trimerized or polymerized fatty acids used for preparing the condensation product (A) may be saturated. Commercially available mixtures of polymerized fatty acids typically comprise substantially— that is, to an extent of at least 99.0 wt %, preferably at least 99.2 or 99.4 wt %, more preferably at least 99.6 or 99.8 wt %, more particularly at least 99.9 or 100 wt %, based in each case on the total weight of the mixture—dimerized and trimerized fatty acids and also, optionally, more highly polymerized fatty acids, i.e., unreacted fatty acids (aliphatic $C_{14}$-$C_{22}$ monocarboxylic acids), in fractions of not more than 1.0 wt %, preferably of not more than 0.8 or 0.6 wt %, more preferably of not more than 0.4 or 0.2 wt %, more particularly of not more than 0.1 wt %, based in each case on the total weight of the mixture. In particular, the mixture of polymerized fatty acids that is used in accordance with the invention for preparing component (a1) contains no unreacted fatty acids.

In one preferred embodiment of the present invention, the condensation product (A) is prepared using as component (a1)
at least one trimerized fatty acid, at least one dimerized fatty acid, or a mixture of polymerized fatty acids comprising at least one trimerized and at least one dimerized fatty acid, or a reaction product (U) of at least two polymerized fatty acids selected from the group consisting of dimerized and trimerized fatty acids and mixtures thereof, and at least one polyamine having at least two primary amino groups.

The condensation product (A) is preferably prepared using as component (a1)
a mixture of polymerized fatty acids which comprises at least one trimerized and at least one dimerized fatty acid,
    the mixture having a fraction of at least 70 wt % of at least one trimerized fatty acid and a fraction of not more than 30 wt % of at least one dimerized fatty acid, based in each case on the total weight of the mixture,
    or a fraction of at least 70 wt % of at least one dimerized fatty acid and a fraction of not more than 30 wt % of at least one trimerized fatty acid, based in each case on the total weight of the mixture,
or a reaction product (U) of at least two polymerized fatty acids (referred to below as fatty acids mixture) selected from the group consisting of dimerized and trimerized fatty acids and mixtures thereof,
    where the fatty acids mixture has a fraction of at least 70 wt % of at least one trimerized fatty acid and a fraction of not more than 30 wt % of at least one dimerized fatty acid, based in each case on the total weight of the fatty acids mixture,
    or a fraction of at least 70 wt % of at least one dimerized fatty acid and a fraction of not more than 30 wt % of at least one trimerized fatty acid, based in each case on the total weight of the fatty acids mixture,
and at least one polyamine having at least two primary amino groups.

The condensation product (A) is prepared more preferably using as component (a1)
a mixture of polymerized fatty acids which comprises at least one trimerized and at least one dimerized fatty acid,
    where the mixture has a fraction of at least 70 wt %, preferably of at least 75 wt %, more preferably of at least 80 wt %, of at least one trimerized fatty acid and a fraction of not more than 30 wt %, preferably of not more than 25 wt %, more preferably of not more than 20 wt % of at least one dimerized fatty acid, based in each case on the total weight of the mixture,
    or a fraction of at least 70 wt %, preferably of at least 75 wt %, more preferably of at least 80 wt %, of at least one dimerized fatty acid and a fraction of not more than 30 wt %, preferably of not more than 25 wt %, more preferably of not more than 20 wt % of at least one trimerized fatty acid, based in each case on the total weight of the mixture,
or a reaction product (U) of at least two polymerized fatty acids (referred to below as fatty acids mixture) selected from the group consisting of dimerized and trimerized fatty acids and mixtures thereof,
    where the fatty acids mixture has a fraction of at least 70 wt %, preferably of at least 75 wt %, more preferably of at least 80 wt %, of at least one trimerized fatty acid and a fraction of not more than 30 wt %, preferably of not more than 25 wt %, more preferably of not more than 20 wt % of at least one dimerized fatty acid, based in each case on the total weight of the fatty acids mixture, or a fraction of at least 70 wt %, preferably of at least 75 wt %, more preferably of at least 80 wt % of at least one dimerized fatty acid and a fraction of not more than 30 wt %, preferably of not more than 25 wt %, more preferably of not more than 20 wt % of at least one trimerized fatty acid, based in each case on the total weight of the fatty acids mixture, and at least one polyamine having at least two primary amino groups.

The reaction product (U) used as component (a1)) is prepared using at least one polyamine having at least two primary amino groups.

Suitable as polyamine is preferably at least one polyalkylenepolyamine, which is used as component (a2) for preparing the condensation product (A).

All preferred embodiments described below in connection with the polyalkylenepolyamine (a2) are also preferred embodiments of the polyamine used for preparing the reaction product (U).

The term "polyamine" in the sense of the present invention refers preferably to a compound which has at least two primary amino groups. In total, however, a polyamine may have up to and including 10 amino groups, in other words, in addition to the at least two primary amino groups, may also contain up to and including 8 further amino groups, i.e., 1, 2, 3, 4, 5, 6, 7, or 8, preferably up to and including 5 further amino groups, which are preferably primary or secondary amino groups, more preferably in each case secondary amino groups. A "polyamine" in the sense of the present invention may be a (hetero)aliphatic, (hetero)cycloaliphatic or (hetero)aromatic polyamine. The polyamine is preferably a diamine or triamine, more preferably a diamine. The polyamine, preferably the diamine, preferably comprises a group which links the at least two primary amino groups to one another and which is preferably selected from the group consisting of —$C_{1-5}$ alkylene-, -(hetero)cycloaliphatic-, -(hetero)aromatic-, —$C_{1-5}$ alkylene-(hetero)cycloaliphatic-$C_{1-5}$ alkylene-, and —$C_{1-5}$ alkylene-(hetero)aromatic-$C_{1-5}$ alkylene-, it being possible for the of the linking groups optionally to be substituted.

The polyamine used for preparing the reaction product (U) is preferably a polyamine of general formula (IV) below

$$H_2N—Z—NH_2 \qquad (IV),$$

wherein Z is selected from the group consisting of —$C_{1-10}$ alkylene-, -(hetero)cycloaliphatic-, -aryl-, -heteroaryl-, —$C_{1-10}$ alkylene-(hetero)cycloaliphatic-$C_{1-10}$ alkylene-, —$C_{1-10}$ alkylene-aryl-$C_{1-10}$ alkylene-, and —$C_{1-10}$ alkylene-heteroaryl-$C_{1-10}$ alkylene-.

Preferred polyamines are ethylenediamine, 1,3-diaminopropane, diethylenetriamine, ethylenepropylenetriamine, dipropylenetriamine, triethylenetetramine, diethylenepropylenetetramine, dipropylene ethylenetetramine, tripropylenetetramine, tetraethylenepentamine, triethylenepropylenepentamine, diethylene-dipropylenepentamine, tripropylene ethylenepentamine, tetrapropylenepentamine, N-(aminoethyl)ethanolamine, pentaethylenehexamine, tetraethylenepropylenehexamine, triethylenedipropylenehexamine, diethylenetripropylene-hexamine, tetrapropylene ethylenehexamine, pentapropylenehexamine, hexaethyleneheptamine, pentaethylenepropyleneheptamine, tetraethylene-dipropyleneheptamine, triethylenetripropyleneheptamine, diethylenetetrapropylene-heptamine, pentapropylene ethyleneheptamine, and hexapropyleneheptamine. Especially preferred polyamines are selected from the group consisting of diethylenetriamine, ethylenepropylenetriamine, dipropylenetriamine, triethylenetetramine, tripropylenetetramine, tetraethylenepentamine, tetrapropylenepentamine, pentaethylenehexamine, pentapropylenehexamine, hexaethyleneheptamine, hexapropyleneheptamine, N-3-aminopropylethylene-diamine, N-3-aminoethylpropylenediamine, N,N'-bis(3-aminopropyl)ethylenediamine, N,N-bis(3-aminopropyl)ethylenediamine, N,N,N'-tris(3-aminopropyl)ethylenediamine, N,N,N',N'-tetrakis(3-aminopropyl)ethylenediamine, N-3-aminopropyl-1,3-diaminopropane, N,N'-bis(3-aminopropyl)-1,3-diaminopropane, N,N-bis(3-aminopropyl)-1,3-diaminopropane, N,N,N'-tris(3-aminopropyl)-1,3-diaminopropane, tetrakis(3-aminopropyl)-1,3-diaminopropane, 1,2-diaminopropane, isophoronediamine, p-phenylenediamine, m-phenylenediamine, m-xylylenediamine, p-xylylenediamine, and 1,6-diaminohexane.

The polyamine used in accordance with the invention need not necessarily be capable of forming at least one imidazoline and/or tetrahydropyrimidine unit. A "polyamine" in the sense of the present invention may, moreover, have at least one further, preferably terminal, functional group.

The reaction product (U) is preferably a bisamide of two polymerized fatty acids and one diamine having at least two primary amino groups.

The reaction product (U) is preferably prepared using an excess of at least two polymerized fatty acids per primary amino group in the polyamine used. The at least two polymerized fatty acids may be the same or different.

Where the reaction product (U) is prepared using two dimerized fatty acids and one polyamine having two primary amino groups, the reaction product (U) preferably has two amide bonds and two free carboxylic acid groups. Where the reaction product (U) is prepared using one dimerized and one trimerized fatty acid and one polyamine having two primary amino groups, the reaction product (U) preferably has two amide bonds and three free carboxylic acid groups. Where the reaction product (U) is prepared using two trimerized fatty acids and one polyamine having two primary amino groups, the reaction product (U) preferably has two amide bonds and four free carboxylic acid groups.

Component (a2)

The condensation product (A) used in accordance with the invention as a thixotropy-increasing additive is obtainable, i.e., is obtained, by reaction of at least one compound (a1) with at least one component (a2).

Used as component (a2) is at least one polyalkylenepolyamine which is capable of forming at least one imidazoline and/or tetrahydropyrimidine unit and which has at least two primary amino groups or at least one primary and at least one secondary amino group. Optionally it is possible for polyalkylenepolyamine (a2) to have at least one further functional group such as, for example, at least one, preferably terminal, hydroxyl group.

In one preferred embodiment, use is made as component (a2) of at least one polyalkylenepolyamine which is capable of forming at least one imidazoline and/or tetrahydropyrimidine unit and which has at least two primary amino groups and which optionally further has at least one secondary amino group.

In another preferred embodiment, use is made as component (a2) of at least one polyalkylenepolyamine which is capable of forming at least one imidazoline and/or tetrahydropyrimidine unit and which has at least one primary, preferably one or two primary, and at least one secondary, preferably one or two secondary, amino group(s) and which optionally further has at least one hydroxyl group, which is preferably terminal.

The polyalkylenepolyamine used as component (a2) for preparing the condensation product (A) preferably has, as at least two primary amino groups, at least two terminal primary amino groups, or has, as at least one primary amino group, at least one terminal primary amino group.

In one preferred embodiment of the present invention, component (a2) has at least one ethylene unit and/or at least one propylene unit as alkylene unit, linking one of the at least two primary amino groups to the other or linking the at least one primary amino group to the at least one secondary amino group.

The term "polyalkylenepolyamine" in the sense of the present invention refers preferably to a compound which has at least two, preferably at least three, amino groups. In this case a polyalkylenepolyamine has at least one primary and at least one secondary amino group or at least two primary amino groups. Overall, however, a polyalkylenepolyamine may have up to and including 10 amino groups—that is, in addition to the at least two primary or the at least one primary and at least one secondary amino group(s), up to and including 8 more, i.e., 1, 2, 3, 4, 5, 6, 7, or 8, preferably up to and including 5 more amino groups, which are preferably primary or secondary, more preferably in each case secondary amino groups. A "polyalkylenepolyamine" in the sense of the present invention further comprises at least one $C_2$ or $C_3$ alkylene unit, i.e., at least one ethylene or propylene unit, within the chemical structure of component (a2), linking at least one primary amino group to at least one further primary or to at least one secondary amino group, thereby endowing the polyalkylenepolyamine with the ability to form at least one imidazoline and/or tetrahydropyrimidine unit. However, a "polyalkylenepolyamine" in the sense of the present invention may have at least one further alkylene unit, preferably at least two or at least three further alkylene units, preferably in each case $C_1$-$C_5$ alkylene units, i.e., alkylene units having 1, 2, 3, 4, or 5 carbon atoms, more preferably in each case $C_1$-$C_3$ alkylene units, i.e., alkylene units having 1, 2, or 3 carbon atoms, which may preferably be selected from the group consisting of methylene, ethylene, propylene, butylene, and pentylene units, more preferably selected from the group consisting of ethylene and propylene units. The polyalkylenepolyamine, however, may have preferably up to 8 such alkylene units. Each alkylene unit preferably links together two amino groups within the polyalkylenepolyamine. A "polyalkylenepolyamine" in the sense of the present invention may also have at least one further, preferably terminal, functional group such as, for example, at least one hydroxyl group which is preferably terminal.

In one preferred embodiment of the present invention, the polyalkylenepolyamine used as component (a2) for preparing the condensation product (A) is a polyalkylenepolyamine of the general formula (I)

(I)

in which
m is 2 or 3, preferably 2,
n is 0, 1, 2, 3, or 4, preferably 1, 2, 3, or 4, very preferably 1, 2, or 3, more particularly 2 or 3, most preferably 2,
p is 1, 2, 3, or 4, preferably 1, 2, or 3, very preferably 1 or 2, more particularly 2, and X is H if n is 0 or
X is $NH_2$ or OH if n is 1, 2, 3, or 4.

In another preferred embodiment of the present invention, the polyalkylenepolyamine used as component (a2) for preparing the condensation product (A) is a polyalkylenepolyamine of the general formula (Ia)

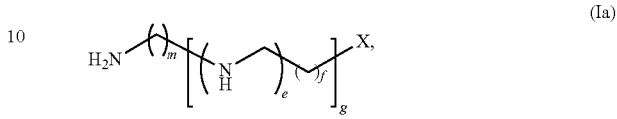

(Ia)

in which
m is 2 or 3, preferably 2,
e is 1, 2, 3, or 4, preferably 1, 2, or 3, very preferably 1 or 1, more particularly 1,
f is 0, 1, 2, 3, or 4, preferably 1, 2, 3, or 4, very preferably 1, 2, or 3, more particularly 1 or 2, most preferably 1, and
g is 1, 2, 3, or 4, preferably 1, 2, or 3, very preferably 1 or 2, more particularly 2, and especially when f is 1 or 2 or is 1,
and X is OH or $NH_2$.

The polyalkylenepolyamine (a2) is preferably selected from the group consisting of ethylenediamine, 1,3-diaminopropane, diethylenetriamine, ethylenepropylenetriamine, dipropylenetriamine, triethylenetetramine, diethylenepropylenetetramine, dipropylene ethylenetetramine, tripropylenetetramine, tetraethylenepentamine, triethylenepropylenepentamine, diethylene-dipropylenepentamine, tripropylene ethylenepentamine, tetrapropylenepentamine, N-(aminoethyl)ethanolamine, pentaethylenehexamine, tetraethylenepropylenehexamine, triethylenedipropylenehexamine, diethylenetripropylene-hexamine, tetrapropylene ethylenehexamine, pentapropylenehexamine, hexaethyleneheptamine, pentaethylenepropyleneheptamine, tetraethylene-dipropyleneheptamine, triethylenetripropyleneheptamine, diethylenetetrapropylene-heptamine, pentapropylene ethyleneheptamine, and hexapropyleneheptamine. Especially preferred polyalkylenepolyamines (a2) are selected from the group consisting of diethylenetriamine, ethylenepropylenetriamine, dipropylenetriamine, triethylenetetramine, tripropylenetetramine, tetraethylenepentamine, tetrapropylenepentamine, pentaethylenehexamine, pentapropylenehexamine, hexaethyleneheptamine, hexapropyleneheptamine, N-3-aminopropylethylene-diamine, N-3-aminoethylpropylenediamine, N,N'-bis(3-aminopropyl)ethylenediamine, N,N-bis(3-aminopropyl)ethylenediamine, N,N,N'-tris(3-aminopropyl)ethylenediamine, N,N,N',N'-tetrakis(3-aminopropyl)ethylenediamine, N-3-aminopropyl-1,3-diaminopropane, N,N'-bis(3-aminopropyl)-1,3-diaminopropane, N,N-bis(3-aminopropyl)-1,3-diaminopropane, N,N,N'-tris(3-aminopropyl)-1,3-diaminopropane, and tetrakis(3-aminopropyl)-1,3-diaminopropane. A very particularly preferred polyalkylenepolyamine (a2) is triethylenetetramine.

The polyalkylenepolyamine used as component (a2) preferably has an amine number of 300 to 2000 mg KOH per g polyalkylenepolyamine, more preferably of 500 to 1900 mg KOH per g polyalkylenepolyamine, very preferably of 700 to 1700 mg KOH per g polyalkylenepolyamine, more particularly of 900 to 1500 mg KOH per g polyalkylenepolyamine.

The skilled person knows of methods for determining the amine number. The amine number is determined preferably according to DIN 16945.

Condensation Product (A)

The condensation product (A) is obtainable by reaction of at least one component (a1)) with at least one component (a2).

The condensation product (A) preferably has an amine number of 100 to 1500 mg KOH per g condensation product (A), more preferably of 150 to 1200 mg KOH per g condensation product (A), very preferably of 200 to 1000 mg KOH per g condensation product (A), more particularly of 250 to 800 mg KOH per g condensation product (A), most preferably of 280 to 600 mg KOH per g condensation product.

The condensation product (A) preferably has an acid number of not more than 10 mg KOH per g condensation product (A), more preferably of not more than 5 mg KOH per g condensation product (A), very preferably of not more than 4 mg KOH per g condensation product (A), more particularly of not more than 3 mg KOH per g condensation product (A), most preferably of not more than 2 mg KOH or of not more than 1 mg KOH or of <1 mg KOH, in each case per g condensation product (A).

The condensation product (A) preferably comprises imidazoline and/or tetrahydropyrimidine units which are formed in the preparation of the condensation product, in other words in the reaction of at least one component (a1)) with at least one component (a2). One measure for verifying such imidazoline and/or tetrahydropyrimidine units in the condensation product (A) is the amount of tertiary nitrogen in the condensation product (A). A further measure for verifying such imidazoline and/or tetrahydropyrimidine units in the condensation product (A) is the appearance of a characteristic band at approximately 1600 cm$^{-1}$ in the infrared spectrum (IR spectrum), this band being characteristic of the presence of an N=C double bond (H. Hein et al., Fette, Seifen, Anstrichmittel 1978, 80, page 448).

The tertiary nitrogen content of the condensation product (A) is determined preferably by means of the method described below.

The condensation product (A) preferably has a tertiary nitrogen content in the range from 0.2 to 25 wt %, more preferably in the range from 0.4 to 25 wt %, very preferably in the range from 0.6 to 25 wt %, especially preferably in the range from 0.8 to 25 wt %, more particularly in the range from 1.0 to 25 wt %, most preferably in the range from 1.2 to 25 wt %, based in each case on the total weight of the condensation product (A).

In another preferred embodiment the condensation product (A) has a tertiary nitrogen content in the range from 0.5 to 20 wt %, more preferably in the range from 0.9 to 15 wt %, more preferably in the range from 1.0 to 12 wt %, very preferably in the range from 1.1 to 10 wt %, more particularly in the range from 1.2 to 8 wt %, most preferably in the range from 1.3 to 6 wt %, based in each case on the total weight of the condensation product (A).

In a further preferred embodiment, the condensation product (A) has a tertiary nitrogen content in the region of at least 0.6 wt %, more preferably of at least 0.8 wt %, very preferably of at least 1.0 wt %, especially preferably of at least 1.2 wt %, more particularly of at least 1.3 wt %, most preferably of at least 1.5 wt %, based in each case on the total weight of the condensation product (A).

The condensation product (A) is preferably prepared using at least 0.90, more preferably at least 0.95, mol, very preferably at least 1.0 mol, of polyalkylenepolyamine (a2) per carboxylic acid group of the polymerized fatty acid used as component (a1)) or of the reaction product (U) used as component (a1). Where, for example, 1 mol of a trimerized fatty acid is used as component (a1), in this case at least 2.7 mol, preferably at least 2.85 mol, more preferably at least 3.0 mol, of polyalkylenepolyamine component (a2) are used for preparing the condensation product (A). In order to prevent unwanted crosslinking reactions, the polyalkylenepolyamine (a2) may be used in particular in excess. In that case, usefully, not more than 1.5 mol, preferably not more than 1.3 mol, more preferably not more than 1.2 mol, and more particularly not more than 1.1 mol of component (a2) are used per carboxylic acid group of the polymerized fatty acid used as component (a1)) or of the reaction product (U) used as component (a1).

The reaction of
(a1) at least one polymerized fatty acid or at least one reaction product (U) of at least two polymerized fatty acids and at least one polyamine having at least two primary amino groups
with
(a2) at least one polyalkylenepolyamine which is capable of forming at least one imidazoline and/or tetrahydropyrimidine unit and which has at least two primary amino groups or at least one primary and at least one secondary amino group, for preparing the condensation product (A), takes place preferably in two steps (step 1 and step 2), which are each repeated for as long as there are carboxylic acid groups present in component (a1), especially if at least one mol of polyalkylenepolyamine (a2) per carboxylic acid group of the polymerized fatty acid used as component (a1) or of the reaction product (U) used as component (a1)) is used for the preparation of the condensation product (A). Using methods known to the skilled person, the preparation of the condensation product (A) may also take place in one step, as for example on selection of a high temperature range, of 150°-300° C., for example, at which the reaction is carried out.

In a first step (step 1), with elimination of a molecule of water, an amide bond is formed by reaction of the at least one primary amino group of the polyalkylenepolyamine (a2) with a carboxylic acid group of component (a1). This step 1 is repeated for each carboxylic acid group of component (a1) until essentially every, preferably every, carboxylic acid group has reacted with the at least one primary amino group of the polyalkylenepolyamine used as component (a2) to form an amide bond, especially if the condensation product (A) is prepared using at least one mol of polyalkylenepolyamine (a2) per carboxylic acid group of the polymerized fatty acid used as component (a1) or of the reaction product (U) used as component (a1). In this way, for example, when using a trimerized fatty acid as component (a1), with elimination of three molecules of water and twofold repetition of step 1, a total of three amide bonds is formed by reaction of each of the three carboxylic acid groups of the trimerized fatty acid with one primary amino group each of a respective polyalkylenepolyamine molecule.

Step 1 is carried out preferably at reaction temperatures in the range from 120° C. to 200° C., more preferably in the range from 130° C. to 190° C., very preferably in the range from 140° C. to 180° C., more particularly in the range from 150° C. to 170° C.

In a second step (step 2), an imidazoline and/or tetrahydropyrimidine unit is formed within the intermediate obtained after step 1. In step 2, an imidazoline and/or tetrahydropyrimidine unit is formed by reaction of the at least one secondary amino group originally present in a component (a2), or of the second primary amino group originally present in a component (a2), with the carbonyl carbon atom of the amide bond formed in step 1 from a carboxylic acid group of component (a1)) and from one of the primary amino groups of the same component (a2), this reaction involving elimination of water and formation of an imine bond. Where the polyalkylenepolyamine (a2) used in step 1 has an ethylene unit as alkylene unit within its chemical structure, linking a primary amino group converted in step 1 to the stated secondary or primary amino group within the chemical structure of component (a2), a 5-membered, imine-containing imidazoline unit is formed in step 2. Where the polyalkylenepolyamine (a2) used in step 1 has a propylene unit as alkylene unit within its chemical structure, linking a primary amino group converted in step 1 to the stated secondary or primary amino group within the chemical structure of component (a2), a 6-membered, imine-containing tetrahydropyrimidine unit is formed in step 2. This step 2 is repeated preferably for each amide bond formed in step 1. In this way, for example, in step 1, when a trimerized fatty acid is used as component (a1), a total of three amide bonds are formed, with elimination of three molecules of water and twofold repetition of step 1, by reaction of each of the three carboxylic acid groups of the trimerized fatty acid with one respective primary amino group of a polyalkylenepolyamine molecule in each case. Then, in step 2, on use of this product obtained according to step 1 and having three amide groups, a total of three imidazoline and/or tetrahydropyrimidine units are formed, with elimination of three molecules of water and with twofold repetition of step 2, by reaction of each carbonyl group of the three carboxamide groups generated in step 1 with one respective secondary amino group of an original polyalkylenepolyamine molecule in each case.

Step 2 is carried out preferably at reaction temperatures in the range from 160° C. to 250° C., more preferably in the range from 170° C. to 240° C., very preferably in the range from 180° C. to 230° C.

Depending on desired viscosity and field of application, the condensation products (A) may be prepared in bulk or with suitable solvents, solvent mixtures, or other suitable vehicle media, and/or may be diluted or formulated after preparation. Suitable solvents or vehicle media are all those which under the reaction conditions chosen are not reactive with the condensation product (A) or with components (a1) and (a2) used for its preparation, or whose reactivity toward these components is negligible, and in which components (a1) and (a2) and the condensation products (A) are at least partly soluble. They include, for example, hydrocarbons such as toluene, xylene, solvent naphtha, aromatic, aliphatic and/or cycloaliphatic petroleum fractions, cyclic and acyclic ethers such as dioxane, tetrahydrofuran, polyalkylene glycol dialkyl ethers such as dipropylene glycol dimethyl ether, alcohols such as methoxypropanol, dipropylene glycol monomethyl ether, polyalkylene glycols, alkoxyalkylene glycols, 1,2-propylene glycol, butyl glycol, benzyl alcohol, esters of monocarboxylic, dicarboxylic or polycarboxylic acids such as ethyl acetate, butyl acetate, dimethyl 2-methylglutarate, phthalates or other plasticizers, dicarboxylic or polycarboxylic esters, dialkyl esters of $C_2$-$C_4$ dicarboxylic acids, referred to as "Dibasic esters", alkyl glycol esters such as ethyl glycol acetate, methoxy propylacetate, acid amides such as dimethylformamide, N-methylpyrrolidone, and the like. The solvent or solvents and/or vehicle media are usefully selected with an eye even at this stage to the planned field of deployment. For example, for deployment in aromatic-free coating systems, preference is given to using aromatic-free solvents. If the products, for example, are to be used in applications where the presence of VOC (volatile organic compounds) is unwanted, the formulation ought as far as possible to be solvent-free or in appropriately high-boiling vehicle media. Particularly suitable for use at the preparation stage are inert solvents which support the removal of the water of reaction by forming azotropes, examples being aromatic hydrocarbons such as xylene or solvent naphtha. Depending on the field of application, the solvents used for the synthesis may remain in the reaction mixture or are fully or partly removed and optionally replaced by other solvents or vehicle media. Depending on compatibility, the condensation products (A) of the invention may also be combined with resins, resin solutions, reactive diluents, binders, or with other additives known in the prior art, such as antisettling agents, surface-active additives such as silicones, for example, and the like, for example.

The solvent may be removed for example by distillation, optionally under reduced pressure and/or azotropically with the addition of water, this removal being complete or partial. The condensation product (A) may also be isolated by precipitation through addition of nonsolvents such as aliphatic hydrocarbons, as for example hexane, with subsequent removal by filtration, and optionally drying. The condensation product (A) obtained by one of these methods may then be diluted in a solvent suitable for the particular field of application, or, optionally, may be used in pure form, as in the case of powder coatings, for example. The solvent in which the condensation product (A) is dissolved may optionally be distilled off, following addition of suitable higher-boiling solvents, optionally under reduced pressure and/or azotropically with addition of water, and as a result the condensation product (A) may be transferred to a vehicle medium suitable for the particular field of application.

The reactions may be carried out in the presence of customary catalysts, examples being sulfonic acids such as para-toluenesulfonic acid, sulfuric acid, trifluoromethanesulfonic acid, or titanic esters.

In one preferred embodiment, the condensation product (A) contains not more than 30 or not more than 20 wt %, preferably not more than 15 wt % or not more than 10 wt %, more preferably not more than 6 wt % or not more than 6 wt %, very preferably not more than 4 wt % or not more than 3 wt %, more preferably not more than 2 wt % or not more than 1 wt %, more particularly not more than 0.5 wt % or not more than 0.4 wt %, especially preferably not more than 0.3 wt % or not more than 0.2 wt %, most preferably not more than 0.1 wt %, of amide bonds (—NH—C(=O)—), based in each case on the total weight of the condensation product (A).

As a result of the basic groups present in the condensation product (A), such as the imidazoline and/or tetrahydropyrimidine units it contains, for example, the condensation products (A) used in accordance with the invention are capable of forming salts. For the purposes of the invention, therefore, they may also be used in the form of the corresponding salts. The at least one condensation product (A) used in accordance with the invention is therefore in the form of the free compound or in the form of a salt of at least one, preferably one, acid. In certain cases, by partial or complete salification of this kind, an improvement can be achieved in the activity, and/or an improved solubility, compatibility, or storage stability can be obtained. In applications where the basicity of the products is a disrupting factor, such as in acidically catalyzed systems, for example, it is also possible frequently to achieve improvements by means of partial or complete neutralization.

Where the condensation product (A) is in the form of at least one salt, these salts are obtained from the received condensation product (A) by reaction with one or more organic or inorganic acids or by quaternization with suitable compounds containing quaternary nitrogen atoms. The amount of acid to be used here is guided by the field of use. Depending on the individual case, the acid components may be used equimolarly, in deficit, or in excess. Neutralization is usefully carried out at not more than an equimolar level, and preferably with a deficit of acid; more preferably, not more than 50% of the preferably tertiary amino groups present in the condensation product (A), and in particular not more than 20% of the preferably tertiary amino groups, are neutralized. Especially preferred condensation products (A) are not neutralized at all. The acids to be used for forming salts may be saturated or unsaturated, linear, branched, (hetero)cycloaliphatic and/or (hetero)aromatic. Preferred salts are those with organic carboxylic acids or acidic phosphoric esters. Examples of such acidic phosphoric esters are given in EP 0 893 155 A2, EP 0 417 490 A2, and U.S. Pat. No. 5,143,952 A. Monofunctional carboxylic acids are preferred. Particularly preferred are monocarboxylic acids having 12 to 22 C atoms, more preferably having 16-20 C atoms. Examples of carboxylic acids are aliphatic and/or aromatic carboxylic acids such as short-chain or long-chain fatty acids, acetic acid, neodecanoic acid, lauric acid, oleic acid, tall oil fatty acid, stearic acid, 12-hydroxystearic acid, ricinoleic acid, natural saturated or unsaturated vegetable or animal fatty acids, bishydroxypropionoic acid, dodecenylsuccinic acid, adipic acid, benzoic acid.

The number-average molecular weight $M_n$ of the condensation product (A) is preferably at least 500 g/mol, more preferably at least 700 g/mol, very preferably at least 850 g/mol, and ideally at least 1000 g/mol. The maximum number-average molecular weight $M_n$ is preferably 10 000 g/mol, more preferably 6000 g/mol, and very preferably 4000 g/mol. The number-average molecular weight $M_n$ is determined by gel permeation chromatography (GPC) against a polystyrene standard, preferably with THF as eluent.

In one preferred embodiment, the at least one condensation product (A) is a compound of the general formula (II)

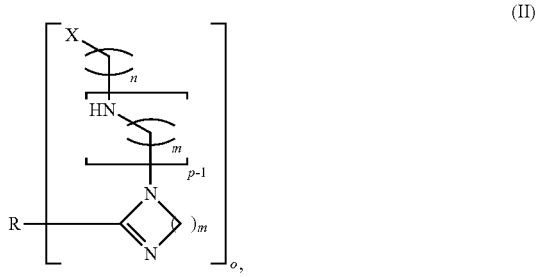

(II)

in which
m is 2 or 3,
n is 0, 1, 2, 3, or 4, preferably 1, 2, 3, or 4, very preferably 1, 2, or 3, more particularly 2 or 3, most preferably 2,
p is 1, 2, 3, or 4, preferably 1, 2, or 3, very preferably 1 or 2, more particularly 2,
X is H if n is 0 or
X is $NH_2$ or OH if n is 1, 2, 3, or 4,
o is 2, 3, 4, 5, or 6, preferably 2 or 3, and
R is a $C_{30}$-$C_{95}$ aliphatic radical, which may optionally be at least monounsaturated,
or R is a radical of the general formula (III)

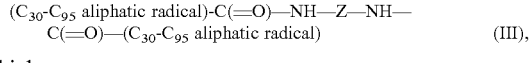

($C_{30}$-$C_{95}$ aliphatic radical)-C(=O)—NH—Z—NH—
C(=O)—($C_{30}$-$C_{95}$ aliphatic radical)     (III), in which
Z is selected from the group consisting of —$C_{1-10}$ alkylene-, -(hetero)cycloaliphatic-, -aryl-, -heteroaryl-, —$C_{1-10}$ alkylene-(hetero)cycloaliphatic-$C_{1-10}$ alkylene-, —$C_{1-10}$ alkylene-aryl-$C_{1-10}$ alkylene-, and —$C_{1-10}$ alkylene-heteroaryl-$C_{1-10}$ alkylene-,
and
where the $C_{30}$-$C_{95}$ aliphatic radical may optionally in each case be at least monounsaturated.

Here, o units, i.e., 2, 3, 4, 5, or 6 units, of the substructure (III-T)

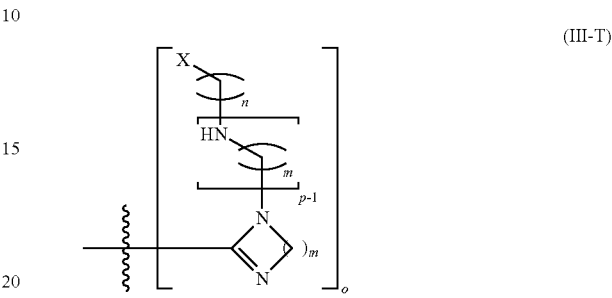

(III-T)

are linked to the radical R, i.e., are bonded to the radical R at 2, 3, 4, 5, or 6 positions within it.

If R is a radical of the general formula (III) then the bonding of the substructure (III-T) to this radical is always via the $C_{30}$-$C_{95}$ aliphatic radicals present in the formula (III).

The meaning of the parameter "o" is dependent on what kind of polymerized fatty acid has been used as component (a1)) or on what kind of reaction product (U) has been used for preparing the condensation product (A). The radical R stands for the radical of the particular at least one polymerized fatty acid used or of the particular reaction product (U) used, the free carboxylic acid groups of which have reacted, for preparing the condensation product (A), with the at least one primary amino group of component (a2) used, with amide formation and subsequent ring closure to give the condensation product (A) of the formula (II).

If, for example, a dimerized fatty acid has been used, then the parameter o has the meaning o=2. If, for example, a trimerized fatty acid has been used, then the parameter o has the meaning o=3. If, for example, a reaction product (U) of two dimerized fatty acids and one polyamine having at least two primary amino groups has been used, then the parameter o has the meaning o=2. If, for example, a reaction product (U) of one dimerized fatty acid, one trimerized fatty acid, and one polyamine having at least two primary amino groups has been used, then the parameter o has the meaning o=3. If, for example, a reaction product (U) of two trimerized fatty acids and one polyamine having at least two primary amino groups has been used, then the parameter o has the meaning o=4.

With preference
the radical R is a $C_{30}$-$C_{38}$ aliphatic radical, which may optionally be at least monounsaturated, and the parameter o is 2,
or
the radical R is a $C_{45}$-$C_{57}$ aliphatic radical, which may optionally be at least monounsaturated, and the parameter o is 3,
or
the radical R is a compound of the general formula (IIIa)

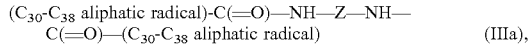

($C_{30}$-$C_{38}$ aliphatic radical)-C(=O)—NH—Z—NH—
C(=O)—($C_{30}$-$C_{38}$ aliphatic radical)     (IIIa), and the parameter o is 2,
or the radical R is a compound of the general formula (III)

$(C_{30}\text{-}C_{38}$ aliphatic radical)-C(=O)—NH—Z—NH—C(=O)—($C_{45}\text{-}C_{57}$ aliphatic radical) (IIIb), and the parameter o is 3,
or
the radical R is a compound of the general formula (III)

$(C_{45}\text{-}C_{57}$ aliphatic radical)-C(=O)—NH—Z—NH—C(=O)—($C_{45}\text{-}C_{57}$ aliphatic radical) (IIIc), and the parameter o is 4,
wherein
Z in each case is selected from the group consisting of —$C_{1\text{-}10}$alkylene-, -(hetero)cycloaliphatic-, -aryl-, -heteroaryl-, —$C_{1\text{-}10}$alkylene-(hetero)cycloaliphatic-$C_{1\text{-}10}$alkylene-, —$C_{1\text{-}10}$alkylene-aryl-$C_{1\text{-}10}$alkylene-, and —$C_{1\text{-}10}$alkylene-heteroaryl-$C_{1\text{-}10}$alkylene-,
and
wherein the $C_{30}\text{-}C_{95}$ aliphatic radical, the $C_{45}\text{-}C_{57}$ aliphatic radical, and the $C_{30}\text{-}C_{38}$ aliphatic radical may optionally each be at least monounsaturated.

In the context of the present invention, the symbol

used in formulae denotes a linkage of a radical in question to the respective superordinate general structure.

The at least one condensation product (A) is used as a thixotropy-increasing additive preferably in combination with at least one thixotropic agent (B), optionally also in combination with at least one binder (C) and optionally in combination with at least one curing agent (D). The use of the at least one condensation product (A) as a thixotropy-increasing additive in this way takes place preferably such that the condensation product (A) is used as a thixotropy-increasing additive in compositions which further comprise at least one thixotropic agent (B) and optionally at least one binder (C) and optionally at least one curing agent (D).

Composition

A further subject of the present invention is therefore a composition comprising
 (A) at least one condensation product in the form of the free compound or in the form of a salt as a thixotropy-increasing additive, the product being obtainable by reaction of
  (a1)) at least one polymerized fatty acid or at least one reaction product (U) of at least two polymerized fatty acids and at least one polyamine having at least two primary amino groups
 with
  (a2) at least one polyalkylenepolyamine which is capable of forming at least one imidazoline and/or tetrahydropyrimidine unit and which has at least two primary amino groups or at least one primary and at least one secondary amino group,
 and
 (B) at least one thixotropic agent,
 and
 (C) optionally at least one binder, and
 (D) optionally at least one curing agent.

The term "comprising" in the sense of the present invention, as for example in connection with the composition of the invention, has in one preferred embodiment the definition of "consisting of".

The fractions in wt % of the components (A), (B), and optionally (C) and optionally (D) in the composition of the invention, and also of any further additives (E) present therein, add up preferably in total to 100 wt %, based on the total weight of the composition.

All embodiments preferred in connection with the condensation product (A) and/or with the use thereof as a thixotropy-increasing additive described hereinabove are also preferred embodiments of the condensation product (A) as a constituent of the composition of the invention.

In one preferred embodiment of the present invention, the thixotropy-increasing additive (A) is not used as a curing agent in the composition of the invention.

In the composition of the invention, the thixotropy-increasing additive (A) is present preferably in an amount in a range from 10 to 100 wt % or 10 to 80 wt %, preferably in a range from 15 to 90 wt % or 15 to 80 wt %, more preferably in a range from 20 to 80 wt %, based in each case on the total weight of the thixotropic agent (B).

In the composition of the invention further comprising at least one binder (C), the thixotropy-increasing additive (A) is present preferably in an amount in a range from 0.1 to 20.0 wt %, more preferably in a range from 0.2 to 18.0 wt %, very preferably in a range from 0.25 to 16 wt %, especially preferably in a range from 0.30 to 14 wt %, more particularly in a range from 0.35 to 12 wt %, most preferably in a range from 0.40 to 8 wt %, based in each case on the total weight of the binder (C).

In one preferred embodiment, the thixotropic agent (B) used in accordance with the invention is an organic or inorganic thixotropic agent (B). Organic thixotropic agents (B) are suitable with preference as thixotropic agents in nonaqueous compositions, whereas inorganic thixotropic agents are suitable preferentially for use in aqueous compositions. The thixotropic agent (B) used in accordance with the invention is preferably an inorganic thixotropic agent (B).

The thixotropic agent (B) is preferably selected from the group consisting of optionally modified phyllosilicates, more particularly optionally modified organophyllosilicates such as bentonite, and silicas such as amorphous silicas, more particularly precipitated silicas and fumed silicas. Precipitated silicas are obtained wet-chemically by precipitation, while fumed silicas are obtained by continuous flame hydrolysis.

As a particularly preferred thixotropic agent (B) used in accordance with the invention, use is made of amorphous silicas, more particularly fumed silicas. In contrast to the silicas obtained by wet-chemical means, which usually possess very high internal surface areas, silicas obtained by flame hydrolysis consist of virtually spherical primary particles having particle diameters of typically 7 to 40 nm. The specific surface areas are preferably in a range from 50 to 400 m²/g, preferably in a range from 50 to 380 m²/g (Degussa Pigments text series, number 54). They have essentially only an external surface area. This surface is partly occupied by siloxane groups, partly by silanol groups. The high proportion of free silanol groups gives untreated fumed silica a hydrophilic character. The silanol groups are capable of reversible construction of a silica network via the development of hydrogen bonds, as a result of which there may be a thixotroping effect. It is also possible, however, although more expensive, to carry out organic aftertreatment of the hydrophilic surface area of fumed silicas, using, for example, silanes such as dimethyldichlorosilane, trimethoxyoctylsilane, or hexamethyldisilazane, in which case the major proportion of the silanol groups are saturated by organic groups and hence the hydrophilic silica is rendered hydrophobic. The fumed silicas can therefore be present in the form of non-organically modified fumed silicas (hydrophilic silicas) or of hydrophobically modified fumed silicas, or in the form of a mixture of these silicas, particular preference being given to the non-organically modified fumed silicas (hydrophilic silicas).

In one preferred embodiment the thixotropic agent (B) is selected from the group consisting of non-organically modified fumed silica, hydrophobically modified fumed silica, and mixtures thereof. The expression "hydrophobically modified fumed silica", i.e., fumed silica modified by means of hydrophobizing, is known to the skilled person, from "Additive kompakt" by Bodo Müller, Vincentz Verlag 2009, pages 35 and 36, for example.

The composition of the invention is preferably a nonaqueous composition. The term "nonaqueous" in connection with the composition of the invention refers preferably to compositions which are substantially anhydrous, i.e., which contain not more than 1.0 wt %, more preferably not more than 0.5 wt %, very preferably not more than 0.1 wt %, of water, based in each case on the total weight of the composition.

The composition of the invention is preferably solvent-free or may optionally comprise organic solvents, in order to set a desired viscosity, for example. The fraction of these organic solvents is preferably not more than 40.0 wt %, more preferably not more than 30.0 wt %, very preferably not more than 20.0 wt %, based in each case on the total weight of the composition of the invention.

In one preferred embodiment, the composition of the invention comprises, further to components (A) and (B), also at least one binder (C) and optionally at least one curing agent (D).

In the composition of the invention further comprising at least one binder (C), the thixotropic agent (B) is preferably present in an amount in a range from 0.5 to 25 wt %, preferably in a range from 1.0 to 22.5 wt %, more preferably in a range from 1.25 to 20.0 wt %, very preferably in a range from 1.5 to 17.5 wt %, especially preferably in a range from 1.75 to 15.0 wt %, most preferably in a range from 2.0 to 10.0 wt %, based in each case on the total weight of the binder (C).

All customary binders known to the skilled person are suitable as binder component (C) of the composition of the invention. The binder may be in dispersion or solution in a diluent such as at least one organic solvent and/or water, preferably in water.

The binder (C) used in accordance with the invention preferably has crosslinkable functional groups. Any customary crosslinkable functional group known to the skilled person is contemplated here. More particularly the crosslinkable functional groups are selected from the group consisting of hydroxyl groups, amino groups, carboxylic acid groups, and unsaturated carbon double bonds, isocyanates, polyisocyanates, and epoxides such as ethylene oxides. The binder (C) is exothermically or endothermically crosslinkable or curable. The binder (C) is crosslinkable or curable preferably in a temperature range from −20° C. up to 250° C. Preferably the binder (C) is crosslinkable at room temperature or at temperatures in the range from 15° C. to 80° C.

The binder (C) is preferably selected from the group consisting of epoxide-based resins, polyester-based resins, in which case the polyesters are preferably unsaturated, vinyl ester-based resins, poly(meth)acrylate-based resins, resins based on at least one (meth)acrylate copolymer, and polyurethane-based resins. These resins and their preparation are known to the skilled person.

Where epoxide-based resins are used as binders (C), the resins suitable as binders (C) are, for example, the epoxide-based resins disclosed in EP 0 835 910 A1. As binders (C) it is preferred for epoxide-based resins to be used that are prepared from glycidyl ethers which have terminal epoxide groups and, within the molecule, hydroxyl groups as functional groups. These are preferably reaction products of Bisphenol A and epichlorohydrin or of Bisphenol F with epichlorohydrin, and mixtures thereof. The curing or crosslinking of such epoxide-based resins is accomplished customarily through polymerization of the epoxide groups of the epoxide ring, through a polyaddition reaction in the form of an addition of other reactive compounds as curing agents (D) in stoichiometric amounts onto the epoxide groups, in which case, accordingly, the presence of one active hydrogen equivalent per epoxide group is necessary (i.e., one H-active equivalent is needed per epoxide equivalent for curing), or through a polycondensation via the epoxide groups and the hydroxyl groups. Examples of suitable curing agents (D) are polyamines, more particularly (hetero) aliphatic, (hetero)aromatic, and (hetero)cycloaliphatic polyamines, polyamidoamines, polyaminoamides, and also polycarboxylic acids and their anhydrides. Suitable polyamines are all polyamines also used for preparing the reaction product (U), it being possible for this product to be used in turn as component (a1)) for preparing the condensation product (A). Where polyamines are used as curing agents (D), those suitable as curing agents (D) are, for example and in particular, the polyamines disclosed in EP 0 835 910 A1.

Where polyester-based resins are used as binders (C), particular suitability is possessed by those polyesters which derive from polyols such as, for example, ethylene glycol or 1,4-butanediol and optionally at least monounsaturated dicarboxylic acids or dicarboxylic acid derivatives such as adipic acid and/or terephthalic acid. Polyester-based resins, especially unsaturated polyester-based resins, are customarily obtainable from various combinations of saturated and unsaturated dicarboxylic acids, dialcohols, and, optionally, suitable monomers. The reactivity of polyester-based resins is determined primarily by the number of reactive unsaturated C—C double bonds of the dicarboxylic acid used or of the dicarboxylic acid derivative used (e.g., maleic acid, maleic anhydride, and fumaric acid); a fraction of saturated dicarboxylic acids (e.g., orthophthalic acid, phthalic anhydride, isophthalic acid, etc.) may influence, for example, the solubility in styrene and also certain later mechanical properties of the end product. Examples of suitable curing agents (D) for curing polyester-based resins, especially unsaturated polyester-based resins, are compounds which permit a radical polymerization as a curing reaction which is initiated, for example, by the decomposition of organic peroxides. The peroxides decompose by way of temperature or the presence of accelerators such as metallic salts, cobalt octoate for example. Since this is a radical polymerization, there is no need for stoichiometric provision of the polyester-based resins and the curing agent (D) to be used; in other words, the curing component (D) can be used in only small, preferably catalytic, amounts.

Where vinyl ester-based resins are used as binders (C), suitability is possessed in particular by those vinyl ester-based resins which can be obtained on reaction of an epoxide-based resin with at least one unsaturated monocarboxylic acid. Resins of these kinds are notable for the presence of at least one terminally positioned C—C double bond. The curing of such vinyl ester-based resins may take place through a radical polymerization, initiated for example by the decomposition of organic peroxides. The peroxides are decomposed via temperature or the presence of accelerators such as metallic salts, cobalt octoate for example. Since this is a radical polymerization, there is no need for stoichiometric provision of the vinyl ester-based resins and the curing agent (D) to be used; in other words, the curing component (D) can be used in only small, preferably catalytic, amounts.

Where poly(meth)acrylate-based resins and/or resins based on at least one (meth)acrylate copolymer are used as binders (C), they are suitably prepared using, in particular, monomer mixtures or oligomer mixtures of esters of acrylic acid and of methacrylic acid. Polymer buildup takes place via the reaction of the C—C double bonds of these monomers. The curing of such poly(meth)acrylate-based resins and/or resins based on at least one (meth)acrylate copolymer may take place through a radical polymerization, initiated for example by the decomposition of organic peroxides. The peroxides are decomposed via temperature or the presence of accelerators such as metallic salts, such as copper octoate, for example, or amines such as N,N-dimethyl-p-toluidine, for example. Since this is a radical polymerization, there is no need for stoichiometric provision of the poly(meth)acrylate-based resins and/or resins based on at least one (meth)acrylate copolymer and the curing agent (D) to be used; in other words, the curing component (D) can be used in only small, preferably catalytic, amounts.

Where polyurethane-based resins are used as binders (C), particularly suitability is possessed by those polyurethane-based resins which are obtained by a polyaddition reaction between hydroxyl-containing compounds such as polyols (such as, for example, hydroxyl groups of polyesters or hydroxyl-containing polyethers and also mixtures thereof) and at least one polyisocyanate (aromatic and aliphatic isocyanates or di- and polyisocyanates). Customarily this requires a stoichiometric reaction of the OH groups of the polyols with the NCO groups of the polyisocyanates. However, the stoichiometric ratio to be used can also be varied, since the polyisocyanate can be added to the polyol component in amounts such that there may be an "overcrosslinking" or an "undercrosslinking".

The composition of the invention comprises the binder (C) preferably in an amount of 20 to 99 wt %, preferably in an amount of 25 to 95 wt %, more preferably in an amount of 30 to 90 wt %, based on the total weight of the binder (C) and of the optionally present curing agent (D).

In a further preferred embodiment, the composition of the invention comprises the binder (C) in an amount of 25 to 99 wt %, preferably in an amount of 30 to 99 wt %, more preferably in an amount of 35 to 95 wt %, based on the total weight of the composition.

Where the composition of the invention comprises at least one curing agent (D), this agent is preferably suitable for crosslinking. Curing agents of this kind are known to the skilled person. To accelerate the crosslinking, suitable catalysts may be added to the composition. All customary curing agents (D) known to the skilled person may be used for producing the composition of the invention.

The composition of the invention preferably comprises the curing agent (D) in an amount of 2 to 100 wt %, preferably in an amount of 2 to 80 wt %, more preferably in an amount of 2 to 50 wt %, based in each case on the total weight of the binder (C).

The composition of the invention preferably comprises the curing agent (D) in an amount of 1 to 20 wt %, preferably in an amount of 2 to 15 wt %, more preferably in an amount of 3 to 10 wt %, based on the total weight of the composition.

In one preferred embodiment, the composition of the invention comprises
at least one binder (C), preferably in an amount in a range from 30 to 99 wt %, based on the total weight of the composition,
the thixotropic agent (B) in an amount in a range from 0.5 to 25 wt %, preferably in a range from 1.0 to 22.5 wt %, more preferably in a range from 1.25 to 20.0 wt %, very preferably in a range from 1.5 to 17.5 wt %, especially preferably in a range from 1.75 to 15.0 wt %, most preferably in a range from 2.0 to 10.0 wt %, based in each case on the total weight of the binder (C),
the thixotropy-increasing additive (A) in an amount in a range from 10 to 100 wt %, preferably in a range from 15 to 90 wt %, more preferably in a range from 20 to 80 wt %, based in each case on the total weight of the thixotropic agent (B),
or
the thixotropy-increasing additive (A) in an amount in a range from 0.1 to 20.0 wt %, more preferably in a range from 0.2 to 18.0 wt %, very preferably in a range from 0.25 to 16 wt %, especially preferably in a range from 0.30 to 14 wt %, more particularly in a range from 0.35 to 12 wt %, most preferably in a range from 0.40 to 8 wt %, based in each case on the total weight of the binder (C),
and
optionally at least one curing agent (D), preferably in an amount in a range from 2 to 100 wt %, preferably in a range from 2 to 50 wt %, based on the total weight of the binder (C).

Depending on the desired application, the composition of the invention may comprise one or more customarily employed additives as component (E). These additives are preferably selected from the group consisting of emulsifiers, flow control assistants, solubilizers, defoaming agents, stabilizing agents, preferably heat stabilizers, process stabilizers, and UV and/or light stabilizers, catalysts, waxes, flexibilizers, flame retardants, solvents, reactive diluents, vehicle media, resins, adhesion promoters, organic and/or inorganic nanoparticles having a particle size <100 nm, such as carbon black, metal oxides and/or semimetal oxides, process aids, plasticizers, solids in powder and fiber form, preferably solids in powder and fiber form that are selected from the group consisting of fillers, glass fibers, reinforcing agents, and pigments, and mixtures of the aforesaid additives (E).

The additive content (E) of the composition of the invention may vary very widely depending on intended use. The content, based on the total weight of the composition of the invention, is preferably 0.1 to 10.0 wt %, more preferably 0.1 to 8.0 wt %, very preferably 0.1 to 6.0 wt %, especially preferably 0.1 to 4.0 wt %, and particularly 0.1 to 2.0 wt %.

The composition of the invention can be provided as a one-component system comprising at least one condensation product (A), at least one thixotropic agent (B), at least one binder (C), at least one curing agent (D), and optionally at least one further additive (E). Alternatively the composition of the invention can be provided as a two-component system comprising at least one condensation product (A), at least one thixotropic agent (B), at least one binder (C), and optionally at least one further additive (E) (base component). Within a two-component system of this kind, the curing agent (D) as curing component may be provided separately from the first component. Two-component systems are therefore systems in which the chemical reaction which leads to curing is initiated by mixing of two components (base component and curing component), in the ratio required for curing. The individual components here are customarily not themselves adhesives, sealants, paints, coating materials, adhesive resins, casting resins, synthetic marble, floor coverings, polymer concrete, or fiber composite materials, since either they are not capable of crosslinking and/or film forming or they do not produce robust materials, films, or adhesive bonds.

The condensation product (A) may also be supplied to the compositions of the invention—which preferably have at least one thixotropic agent (B) and at least one binder (C) and optionally at least one curing agent (D)—together with a further component such as, for example, an additive (E), such as a pigment paste or a binder (C), only shortly before mixing takes place, such as in a metering and mixing unit in the mixing head, for example. The mixture of the components must be processed within a certain time (pot life or working time), since the workability deteriorates increasingly after this time has elapsed. Two-component systems are used when requirements are particularly exacting in terms of the temperature sensitivity of the article to be coated, excessive article size (architectural facings, machines, rotor blades of wind turbines, etc.), resistance to mechanical, chemical, and climatic loads, and rapid curing at room temperature or slightly elevated temperatures (up to 100° C., for example). With two-component systems, each of the components is stored separately, and the reactive mixture of the components is produced only as and when required.

The present invention further relates to a method for producing the compositions of the invention. The composition of the invention can be produced by mixing and dispersing and/or dissolving the respective components of the coating composition, which have been described above, using—for example—automated metering and mixing units, high-speed stirrers, stirred tanks, agitator mills, dissolvers, kneading apparatus, or inline dissolvers.

The composition of the invention is suitable as an adhesive, sealant, paint, coating material, adhesive resin, casting resin, synthetic marble, floor covering, polymer concrete, or fiber composite material, more particularly as adhesive resin.

A further subject of the present invention is therefore a use of the composition of the invention as an adhesive, sealant, paint, coating material, adhesive resin, casting resin, synthetic marble, floor covering, polymer concrete, or fiber composite material, preferably as an adhesive, sealant, paint, coating material, adhesive resin, or casting resin, more particularly as an adhesive resin.

A further subject of the present invention is a condensation product (A) in the form of the free compound or in the form of a salt, the product being obtainable by reaction of
(a1)) at least one polymerized fatty acid such as, for example, at least one dimerized or trimerized fatty acid or a mixture of polymerized fatty acids which comprises a fraction of at least 50 wt % of trimerized fatty acids, based on the total weight of the mixture, preferably at least one trimerized aliphatic $C_{18}$ monocarboxylic acid or a mixture of a trimerized aliphatic $C_{18}$ monocarboxylic acid and a dimerized aliphatic $C_{18}$ monocarboxylic acid, or
at least one reaction product (U) of at least two polymerized fatty acids and at least one polyamine having at least two primary amino groups, preferably at least one reaction product (U) of at least two polymerized fatty acids and at least one polyamine having at least two primary amino groups,
with
(a2) at least one polyalkylenepolyamine which is capable of forming at least one imidazoline and/or tetrahydropyrimidine unit and which has at least two primary amino groups or at least one primary and at least one secondary amino group, preferably triethylenetetramine.

All embodiments preferred in connection with the condensation product (A) and with the use thereof as a thixotropy-increasing additive described hereinabove are also preferred embodiments of the condensation product (A) per se.

Determination of the Tertiary Nitrogen Content

The tertiary nitrogen content indicates the percentage amount of bonded tertiary basic nitrogen in a sample under analysis. The determination method utilizes the fact that unlike primary and secondary amino groups, tertiary amino groups do not react with anhydrides to form amides: when primary and secondary amino groups are acetylated with acetic anhydride, the tertiary amino groups can be subsequently titrated quantitatively with perchloric acid. For determining the tertiary nitrogen content of a sample, an amount of a sample to be analyzed is weighed out to an accuracy of 0.1 mg into an 80 ml beaker on an analytical balance. The amount of the sample to be analyzed that is to be weighed out is guided by the anticipated tertiary nitrogen content, and is evident from the table below:

| Anticipated tertiary nitrogen content [%] | Amount of sample to be weighed out [g] |
|---|---|
| 0-0.3 | 3-5 |
| 0.3-0.6 | 1.5-3 |
| 0.6-0.9 | 1.0-1.5 |
| 0.9-1.5 | 0.6-1.0 |
| 1.5-2.0 | 0.45-0.6 |
| 2.0-3.0 | 0.30-0.45 |
| 3-5 | 0.15-0.30 |
| 5-10 | 0.08-0.15 |
| 10-20 | 0.06-0.08 |

The sample is dissolved in 20 ml of acetic acid (99.8% strength) and 30 ml of acetic anhydride (98.5% strength). The resulting sample solution is then fitted with a ground glass lid and heated in a heating block or water bath at 70° C. for a time of 30 minutes. After the sample solution has cooled, it is placed onto a magnetic stirrer and a combined Ag/AgCl electrode is immersed into the sample solution. The combined electrode is part of a microprocessor-controlled analytical instrument (Titrator DL77, DL70 ES, or DL67) from Mettler. The sample solution is titrated with perchloric acid (0.1 N in acetic acid, anhydride-free). The tertiary nitrogen content is determined by the analytical instrument used. The tertiary nitrogen content is calculated as follows:

$$\text{Tertiary } N \text{ content } (wt\ \%) = \frac{\text{consumption ml} \times N \times f \times 1.4008}{\text{Initial mass in g}}$$

N=normality of the titrant
f=factor of the titrant
The factor f here takes account of any deviation in the titrant used from a normality of 0.1 N.

Determination of the Sagging Behavior and of the Sagging Limit

To determine the sagging behavior and to determine the sagging limit, the procedure adopted is as follows:

A composition of the invention is provided that comprises at least one condensation product (A) and at least one thixotropic agent (B), the composition further comprising at least one binder (C). Added to this composition with stirring is at least one curing agent (D) and the resulting composition is mixed further for a time of 1 minute. The resulting composition of the invention is introduced into a stepped coater apparatus from Erichsen (model 421-S) and applied using a bench applicator from Erichsen (model 509 MC III) onto a Byko-chart-2802 chart (drawdown chart) at a rate of advance of 25 mm/s, in different film thicknesses. With the stepped coater used here, film thicknesses of up to a maximum of 1000 µm in gradations of 50 µm can be obtained.

Immediately after the drawdown, the composition is stood up vertically and is cured, depending on the binder (C) used, at room temperature or at 60° C. for a time of approximately 14 hours. Curing is followed by the determination of the sagging behavior and the determination of the sagging limit, from the visually evaluatable standing ability of the compositions applied in different film thicknesses.

The higher the sagging limit, the better the thixotropy-increasing effect of the condensation product (A) present in the composition of the invention, and the higher the film thickness at which the composition of the invention can be applied to vertical surfaces without sagging.

The inventive and comparative examples below serve for elucidation of the invention, but should not be interpreted restrictively.

INVENTIVE AND COMPARATIVE EXAMPLES

Unless otherwise stated, the amounts in parts are parts by weight, and amounts in percent are percentages by weight.

1. Preparation of Condensation Products (A)

1.1 General Protocol for Preparing Condensation Products (A) Used in Accordance with the Invention as Thixotropy-Increasing Additives:

At least one polymerized fatty acid or at least one reaction product of at least two polymerized fatty acids and at least one polyamine having at least two primary amino groups as component (a1), or a derivative thereof which can be used in each case for preparing the condensation product (A), such as a corresponding ester, for example, is charged to a reaction vessel with stirrer, reflux condenser, and water separator, and is mixed with at least one polyalkylenepolyamine as component (a2) and optionally with at least one solvent, and the mixture is heated with stirring to a temperature in the range from 150° C. to 300° C., until the desired amount of water has separated off, this preferably indicating the complete reaction of component (a1)) with component (a2).

The condensation products (A) below, indicated in table 1, are obtained in this way as examples K1-K31. In each case, 1 mol of component (a2) is used per carboxylic acid group contained in component (a1). Where, for example, 1 mol of a trimerized fatty acid is used as component (a1), 3 mol of component (a2) are used.

TABLE 1

| Example | Component (a1) | Amount of (a1) [g] | Component (a2) | Amount of (a2) [g] | Solvent L | Amount of water separated off [g] |
|---|---|---|---|---|---|---|
| K1 | A1 | 303 | B1 | 150 | 400 g L1 | 36 |
| K2 | A2 | 572 | B1 | 292 | 400 g L1 | 72 |
| K3 | A3 | 575 | B1 | 292 | 400 g L1 | 72 |
| K4 | A4 | 581 | B1 | 292 | 400 g L1 | 72 |
| K5 | A5 | 881 | B1 | 438 | 400 g L1 | 108 |
| K6 | A8 | 1188 | B1 | 292 | 200 g L1 | 72 |
| K7 | A9 | 1250 | B1 | 292 | 200 g L1 | 72 |
| K8 | A10 | 1230 | B1 | 292 | 200 g L1 | 72 |
| K9 | A11 | 1284 | B1 | 292 | — | 72 |
| K10 | A12 | 1862 | B1 | 584 | — | 144 |
| K11 | A13 | 1896 | B1 | 584 | — | 144 |
| K12 | A14 | 1536 | B1 | 438 | — | 108 |
| K13 | A3 + A5 | 291 + 291 | B1 | 292 | 400 g L1 | 72 |
| K14 | A6 + A5 | 592 + 592 | B1 | 584 | 400 g L1 | 144 |
| K15 | A3 + A8 | 882 + 882 | B1 | 292 | 400 g L1 | 72 |
| K16 | A3 | 575 | B2 | 206 | 400 g L1 | 72 |
| K17 | A5 | 881 | B2 | 309 | 400 g L1 | 108 |
| K18 | A3 + A5 | 291 + 291 | B2 | 206 | 400 g L1 | 72 |
| K19 | A12 | 1862 | B2 | 412 | — | 144 |
| K20 | A3 | 575 | B3 | 378 | 400 g L1 | 72 |
| K21 | A5 | 881 | B3 | 568 | 400 g L1 | 108 |
| K22 | A2 | 572 | B3 | 378 | 400 g L1 | 72 |
| K23 | A3 | 575 | B4 | 464 | 400 g L1 | 72 |
| K24 | A5 | 881 | B4 | 698 | 400 g L1 | 108 |
| K25 | A3 | 575 | B5 | 148 | 400 g L1 | 72 |
| K26 | A5 | 881 | B5 | 222 | 400 g L1 | 108 |
| K27 | A3 | 575 | B6 | 262 | 400 g L1 | 72 |
| K28 | A5 | 881 | B6 | 393 | 400 g L1 | 108 |
| K29 | A3 | 575 | B7 | 294 | 400 g L1 | 72 |
| K30 | A5 | 881 | B7 | 441 | 400 g L1 | 108 |
| K31 | A7 | 603 | B7 | 294 | 400 g L1 | ** |

** In the case of K-31, with A-7, a dimethyl ester of a dimerized fatty acid was used as component (a1). In the reaction, therefore, methanol as well as water is separated off. In total 64 g of methanol and 32 g of water are separated off.

The abbreviations used in table 1 have the following meanings:

Component (a1):
  A1: mixture of polymerized unsaturated aliphatic $C_{18}$ fatty acids with a fraction of 80 wt % of trimerized fatty acid and a fraction of 20 wt % of dimerized fatty acid, based in each case on the total weight of the mixture, having an acid number of 185 mg KOH/g,
  A2: mixture of polymerized saturated fatty acids with a fraction of 92-98 wt % of dimerized fatty acid, based on the total weight of the mixture, having an acid number of 196 mg KOH/g, available commercially under the name Pripol 1006 from Croda,
  A3: mixture of polymerized fatty acids with a fraction of >97 wt % of dimerized fatty acid, based on the total weight of the mixture, having an acid number of 195 mg KOH/g, available commercially under the name Pripol 1012 from Croda,
  A4: mixture of polymerized fatty acids having a fraction of 72-79 wt % of dimerized fatty acid and a fraction of 20-23 wt % of trimerized fatty acid, based in each case on the total weight of the mixture, having an acid number of 193 mg KOH/g, available commercially under the name Pripol 1022 from Croda,
  A5: mixture of polymerized fatty acids with a fraction of >75 wt % of trimerized fatty acid, based in each case on the total weight of the mixture, having an acid number of 191 mg KOH/g, available commercially under the name Pripol 1040 from Croda,
  A6: Tall oil fatty acid having an acid number of 186 mg KOH/g,
  A7: dimethyl ester of a dimerized fatty acid, present in a mixture of polymerized fatty acids with a fraction of >97 wt %, based on the total weight of the mixture.

The compounds A8 to A14 used as component (a1)) are reaction products of at least two polymerized fatty acids and at least one polyamine having at least two primary amino groups. The reaction products A8 to A14 used as component (a1)) can be obtained in accordance with the following general protocol:

At least one polymerized fatty acid or a derivative thereof which can be used to prepare the reaction product (U), such as a corresponding ester, for example, is charged to a reaction vessel with stirrer, reflux condenser, and water separator, and is mixed with at least one polyamine having at least two primary amino groups, such as a diamine, for example, and optionally with at least one solvent, and the mixture is heated with stirring to a temperature in the range from 130° C. to 160° C. until the desired amount of water has separated off.

The stated reaction products A8 to A14 below, which can be used in table 2 as component (a1), are obtained in this way.

| Component (a1) | Polymerized fatty acid used | Amount of polymerized fatty acid [g] | Polyamine | Amount of polyamine [g] | Solvent L | Amount of water separated off [g] |
| --- | --- | --- | --- | --- | --- | --- |
| A8 | A3 | 1150 | B5 | 74 | 200 g L1 | 36 |
| A9 | A3 | 1150 | B8 | 136 | 200 g L1 | 36 |
| A10 | A3 | 1150 | B9 | 116 | 200 g L1 | 36 |
| A11 | A3 | 1150 | B10 | 170 | 400 g L1 | 36 |
| A12 | A5 | 1762 | B8 | 136 | 400 g L1 | 36 |
| A13 | A5 | 1762 | B10 | 170 | 400 g L1 | 36 |
| A14 | A3 + A5 | 728 + 728 | B9 | 116 | 400 g L1 | 36 |

The abbreviations A3, A5, L1, and B5 used in table 2 have the meanings as in table 1.

The abbreviations additionally used in table 2 have the following meanings:

B8: m-xylylenediamine (CAS No.: 153326-45-5)
B9: 1,6-diaminohexane (CAS No.: 124-09-4)
B10: isophoronediamine (isomer mixture, CAS No.: 2855-13-2)

Component (a2):
B1: triethylenetetramine (CAS No.: 112-24-3)
B2: diethylenetriamine (CAS No.: 111-40-0)
B3: tetraethylenepentamine (CAS No.: 112-57-2)
B4: pentaethylenehexamine (isomer mixture, CAS No.: 4067-16-7)
B5: 1,3-diaminopropane (CAS No.: 109-76-2)
B6: dipropylenetriamine (CAS No.: 56-18-8)
B7: 2-(2-(2-aminoethylamino)ethylamino)ethanol (CAS: 1965-29-3)

Solvent:
L1: solvent naphtha, aromatic hydrocarbon fraction, boiling range: 150° C. to 210° C.

2. Production of Inventive Compositions and Comparative Compositions

General protocol for producing inventive compositions comprising at least one condensation product (A), at least one thixotropic agent (B), and at least one binder (C), and optionally at least one curing agent (D), and also corresponding comparative compositions.

2.1 Compositions Comprising at Least One Poly(Meth)Acrylate-Based Resin as Binder (C)

To prepare the binder (C), 20% of Degalan LP 51/3 (acrylic polymer from Evonik) is dissolved in methyl methacrylate (from Evonik). 50 fractions of this liquid base syrup are admixed with 0.25 fraction of the accelerator Pergaquick A150 (N,N-di-(2-hydroxyethyl)-p-toluidine from Pergan), and the accelerator is incorporated into the syrup using a Dispermat CV (toothed disk 2 cm, 1500 rpm for 2 minutes).

This is followed by the addition of one fraction of Aerosil 200 (hydrophilic fumed silica, specific surface area of 200 m²/g, from Evonik) as thixotropic agent (B). This mixture is dispersed in the system for 5 minutes in the Dispermat CV (toothed disk 4 cm, 8000 rpm).

Added to this mixture subsequently is a condensation product (A), for producing an inventive composition Z1 to Z7, or a compound C1 known from DE 37 06 860 A1 (disclosed therein as example 8), for producing a comparative composition CZ1 (see table 3), with incorporation in each case for 1 minute using the Dispermat CV, toothed disk 2 cm, 1500 rpm. In addition, a corresponding composition is produced without addition of a further component (comparative composition CZ2).

After they have cooled to room temperature, 50 g of each of the compositions Z1 to Z7 and CZ1 to CZ2 are admixed with 0.75 g of Peroxan BP powder 50W (dibenzoyl peroxide from Pergan) as curing agent (D), and the compositions are homogenized over a period of 60 seconds.

For the compositions Z1 to Z7 and CZ1 to CZ2, their sagging behavior and the sagging limit are determined by the method described above, with the curing taking place at room temperature. The highest stable film thickness at which no sagging is observed is reported as the sagging limit in µm. The results are set out in table 3:

TABLE 3

| Inventive/comparative example | Condensation product (A) | Amount of (A), based in each case on the total weight of the thixotropic agent (B) [wt %] | Amount of (B), based in each case on the total weight of the binder (C) [wt %] | Sagging limit [µm] |
| --- | --- | --- | --- | --- |
| CZ2 | — | — | 2.0 | <500 |
| CZ1 | C1* | 20 | 2.0 | 800 |
| Z1 | K1 | 20 | 2.0 | >1000 |
| Z2 | K3 | 20 | 2.0 | 900 |
| Z3 | K4 | 20 | 2.0 | >1000 |
| Z4 | K13 | 20 | 2.0 | >1000 |
| Z5 | K16 | 20 | 2.0 | 950 |
| Z6 | K17 | 20 | 2.0 | >1000 |
| Z7 | K24 | 20 | 2.0 | 950 |

*C1: as comparative example C1, example compound 8 from DE 3706860 A1 was used.

2.2 Compositions Comprising at Least One Polyester-Based Resin (Unsaturated Polyester) as Binder (C)

To prepare the binder (C), 100 fractions of Palatal P 4-01 (unsaturated polyester resin based on orthophthalic acid and glycols in solution in styrene, from DSM) are introduced together with 1.0 fraction of NL 49 P (cobalt octoate, from AKZO Nobel) as accelerator and with 0.5 fraction of BYK-A 555 (deaerating agent, BYK-Chemie) and incorporated by means of a Dispermat CV (toothed disk 2 cm, 1500 rpm) for 2 minutes.

This is followed by the addition of 2.0 fractions of Aerosil 200 (hydrophilic fumed silica, specific surface area of 200 m²/g, from Evonik) as thixotropic agent (B). The mixture is dispersed for 15 minutes in the Dispermat CV (toothed disk 4 cm, 8000 rpm).

Added to this mixture subsequently is a condensation product (A), for producing an inventive composition Z8 to Z14, or a compound C1 known from DE 37 06 860 A1 (disclosed therein as example 8), for producing a comparative composition CZ3 (see table 4), with incorporation in each case for 1 minute using the Dispermat CV, toothed disk 2 cm, 1500 rpm. In addition, a corresponding composition is produced without addition of a further component (comparative composition CZ4). Moreover, a corresponding composition is produced without addition of a further component and also without addition of the thixotropic agent (B) (comparative composition CZ5).

Added to 50 g of each of the compositions is 0.5 g of Trigonox 44 B (acetylacetone peroxide, AKZO Nobel) as curing agent (D), and the compositions are homogenized over a time of 60 seconds.

For the compositions Z8 to Z14 and CZ3 to CZ5, their sagging behavior and the sagging limit are determined by the method described above, with the curing taking place at 60° C. The highest stable film thickness at which no sagging is observed is reported as the sagging limit in μm. The results are set out in table 4:

TABLE 4

| Inventive/ comparative example | Condensation product (A) | Amount of (A), based in each case on the total weight of the thixotropic agent (B) [wt %] | Amount of (B), based in each case on the total weight of the binder (C) [wt %] | Sagging limit [μm] |
|---|---|---|---|---|
| CZ5 | — | — | — | 50 |
| CZ4 | — | — | 2.0 | <500 |
| CZ3 | C1* | 20 | 2.0 | 650 |
| Z8 | K1 | 20 | 2.0 | 850 |
| Z9 | K3 | 20 | 2.0 | 700 |
| Z10 | K4 | 20 | 2.0 | >1000 |
| Z11 | K13 | 20 | 2.0 | 900 |
| Z12 | K16 | 20 | 2.0 | 750 |
| Z13 | K17 | 20 | 2.0 | 950 |
| Z14 | K24 | 20 | 2.0 | 900 |

*C1: as comparative example C1, example compound 8 from DE 3706860 A1 was used.

2.3 Compositions Comprising at Least One Polyester-Based Resin (Unsaturated Polyester) as Binder (C)

To prepare the binder (C), 100 fractions of KRF-1100 (unsaturated polyester resin based on orthophthalic acid and standard glycols from CCP) are introduced together with 1.0 fraction of accelerator NL 49 P and with 0.5 fraction of BYK-A 555 and incorporated by means of a Dispermat CV (toothed disk 2 cm, 1500 rpm) for two minutes.

This is followed by the addition of 3.0 fractions of Aerosil 200 as thixotropic agent (B). The whole system is dispersed for 15 minutes in the Dispermat CV, toothed disk 4 cm, 8000 rpm.

Added to this mixture subsequently is a condensation product (A), for producing an inventive composition Z15 to Z21, or a compound C1 known from DE 37 06 860 A1 (disclosed therein as example 8), for producing a comparative composition CZ6 (see table 5), with incorporation in each case for 1 minute using the Dispermat CV, toothed disk 2 cm, 1500 rpm. In addition, a corresponding composition is produced without addition of a further component (comparative composition CZ7). Moreover, a corresponding composition is produced without addition of a further component and also without addition of the thixotropic agent (B) (comparative composition CZ8).

Added to 50 g of each of the compositions is 0.5 g of Trigonox 44 B (acetylacetone peroxide, AKZO Nobel) as curing agent (D), and the compositions are homogenized over a time of 60 seconds.

For the compositions Z15 to Z21 and CZ6 to CZ8, their sagging behavior and the sagging limit are determined by the method described above, with the curing taking place at 60° C. The highest stable film thickness at which no sagging is observed is reported as the sagging limit in μm. The results are set out in table 5.

TABLE 5

| Inventive/ comparative example | Condensation product (A) | Amount of (A), based in each case on the total weight of the thixotropic agent (B) [wt %] | Amount of (B), based in each case on the total weight of the binder (C) [wt %] | Sagging limit [μm] |
|---|---|---|---|---|
| CZ8 | — | — | — | 50 |
| CZ7 | — | — | 3.0 | <500 |
| CZ6 | C1* | 20 | 3.0 | 650 |
| Z15 | K1 | 20 | 3.0 | >1000 |
| Z16 | K3 | 20 | 3.0 | 850 |
| Z17 | K4 | 20 | 3.0 | >1000 |
| Z18 | K13 | 20 | 3.0 | 750 |
| Z19 | K16 | 20 | 3.0 | 800 |
| Z20 | K17 | 20 | 3.0 | >1000 |
| Z21 | K24 | 20 | 3.0 | 850 |

*C1: as comparative example C1, example compound 8 from DE 3706860 A1 was used.

2.4 Compositions Comprising at Least One Epoxide-Based Resin as Binder (C)

To prepare the binder (C), 99.5 fractions of liquid epoxy resin blend (RIM R 1335: modified bisphenol A resin, molecular weight >700 g/mol, epoxide value: 5.6 mol/kg, from Momentive) are admixed with 0.5 fraction of BYK A-530 (deaerating agent, from BYK-Chemie) and incorporated using a Dispermat CV (toothed disk 2 cm, 1500 rpm) for 2 minutes.

This is followed by the addition of 2.6 parts of Aerosil 200 or Aerosil 380 (hydrophilic fumed silica, specific surface area of 380 m$^2$/g, from Evonik) as thixotropic agent (B). This mixture is dispersed for 15 minutes in the Dispermat CV (toothed disk 4 cm, 8000 rpm) (component M1).

100 fractions of an amine curing agent blend as curing agent (D) (CeTePox 1393-02H (mixture of isophoronediamine, m-xylylenediamine, benzyl alcohol, salicylic acid, and nonylphenol, H equivalent 93, from CTP GmbH)) are introduced in a mixing vessel. Added to this mixture subsequently is a condensation product (A), for producing an inventive composition Z22 to Z29, or a compound C1 known from DE 37 06 860 A1 (disclosed therein as example 8), for producing a comparative composition CZ9 (see table 6), with incorporation in each case for 2 minutes using the Dispermat CV, toothed disk 2 cm, 1500 rpm (component M2). In addition, a corresponding composition is produced without addition of a further component (comparative composition CZ10).

100 parts of component M1 are mixed thoroughly with 50 parts of component M2 in a beaker for 1 minute.

For the compositions Z22 to Z29 and CZ9 to CZ10, their sagging behavior and the sagging limit are determined by the method described above, with the curing taking place at room temperature. The highest stable film thickness at which no sagging is observed is reported as the sagging limit in μm. The results are set out in table 6.

The compositions CZ9, CZ10, Z22 and Z24-Z29 contain Aerosil 200 as thixotropic agent (B), and composition Z23 contains Aerosil 380 as thixotropic agent (B).

TABLE 6

| Inventive/comparative example | Condensation product (A) | Amount of (A), based in each case on the total weight of the thixotropic agent (B) [wt %] | Amount of (B), based in each case on the total weight of the binder (C) [wt %] | Sagging limit [μm] |
| --- | --- | --- | --- | --- |
| CZ10 | — | — | 2.6 | <550 |
| CZ9 | C1* | 20 | 2.6 | <550 |
| Z22 | K1 | 20 | 2.6 | >1000 |
| Z23 | K1 | 20 | 2.6 | >1000 |
| Z24 | K3 | 20 | 2.6 | 900 |
| Z25 | K4 | 20 | 2.6 | >1000 |
| Z26 | K13 | 20 | 2.6 | 900 |
| Z27 | K16 | 20 | 2.6 | 750 |
| Z28 | K17 | 20 | 2.6 | >1000 |
| Z29 | K24 | 20 | 2.6 | >1000 |

*C1: as comparative example C1, example compound 8 from DE 3706860 A1 was used.

2.5 Compositions Comprising at Least One Epoxide-Based Resin as Binder (C)

For the preparation of the binder (C), 64 parts of liquid epoxy resin (Epikote 1001: modified bisphenol-A resin from Momentive) are admixed with 0.5 fraction of BYK-052 (silicone-free, polymer-based defoamer, BYK-Chemie), 7.5 fractions of Bayferrox 130 M (red iron oxide pigment from Lanxess), 57 fractions of Blanc Fixe N (barium sulfate from Sachtleben), and 21 parts of isobutanol, and incorporated using a Dispermat CV (toothed disk 4 cm, 8500 rpm) for 30 minutes.

This is followed by the addition of 1 part of thixotropic agent (B). This mixture is dispersed for 15 minutes with the Dispermat CV, toothed disk 4 cm, 8500 rpm (component M1). Used as thixotropic agent (B) is Aerosil 200 or Aerosil R972 (fumed silica hydrophobized with dimethyldichlorosilane, from Evonik) (component M1).

100 parts of Epikure 550 (amine curing agent blend, Momentive) as curing agent (D) are introduced in a mixing vessel. Added to this mixture subsequently is a condensation product (A) for producing an inventive composition Z30 to Z37, or a compound C1 known from DE 37 06 860 A1 (disclosed therein as example 8), for producing a comparative composition CZ11 (see table 7), with incorporation in each case for 2 minutes with the Dispermat CV, toothed disk 2 cm, 1500 rpm (component M2). Moreover, a corresponding composition is produced without addition of a further component (comparative composition CZ12).

100 parts of component M1 are mixed thoroughly with 33 parts of component M2 in a beaker for 1 minute.

For the compositions Z30 to Z37 and CZ11 to CZ12, their sagging behavior and the sagging limit are determined by the method described above, with the curing taking place at room temperature. The highest stable film thickness at which no sagging is observed is reported as the sagging limit in μm. The results are set out in table 7.

The compositions CZ11, CZ12, Z30, and Z32-Z37 contain Aerosil 200 as thixotropic agent (B), and the composition Z31 contains Aerosil R972 as thixotropic agent (B).

TABLE 7

| Inventive/comparative example | Condensation product (A) | Amount of (A), based in each case on the total weight of the thixotropic agent (B) [wt %] | Amount of (B), based in each case on the total weight of the binder (C) [wt %] | Sagging limit [μm] |
| --- | --- | --- | --- | --- |
| CZ12 | — | — | 1 | 100 |
| CZ11 | C1* | 66 | 1 | <550 |
| Z30 | K1 | 66 | 1 | 700 |
| Z31 | K1 | 66 | 1 | >1000 |
| Z32 | K3 | 66 | 1 | 750 |
| Z33 | K4 | 66 | 1 | 950 |
| Z34 | K13 | 66 | 1 | 650 |
| Z35 | K16 | 66 | 1 | 800 |
| Z36 | K17 | 66 | 1 | 750 |
| Z37 | K24 | 66 | 1 | 600 |

*C1: as comparative example C1, example compound 8 from DE 3706860 A1 was used.

2.6 Compositions Comprising at Least One Polyurethane-Based Resin as Binder (C)

For the preparation of the binder (C), 50 fractions of Setathone 1150 (branched polyester/polyether polyol, OH number 4.7, from Nuplex) are introduced. This is followed by the addition of 2.25 parts of Aerosil 200 as thixotropic agent (B). The mixture is dispersed in the system for 15 minutes in a Dispermat CV (toothed disk 4 cm, 8000 rpm).

Added to this mixture subsequently is a condensation product (A), for producing an inventive composition Z38 to Z44, or a compound C1 known from DE 37 06 860 A1 (disclosed therein in example 8), for producing a comparative composition CZ13 (see table 8), with incorporation in each case for 1 minute with the Dispermat CV, toothed disk 2 cm, 1500 rpm. Moreover, a corresponding composition is produced without addition of a further component (comparative composition CZ14).

After the compositions produced have cooled to room temperature, 50 g of the composition thus produced are admixed with 21.1 g of the curing agent Desmodur VL (aromatic polyisocyanate based on diphenylmethanediisocyanate, 31.5% NCO content, from Bayer) and the composition is homogenized for 60 seconds.

For the compositions Z38 to Z44 and CZ13 to CZ14, their sagging behavior and the sagging limit are determined by the method described above, with the curing taking place at room temperature. The highest stable film thickness at which no sagging is observed is reported as the sagging limit in μm. The results are set out in table 8.

TABLE 8

| Inventive/comparative example | Condensation product (A) | Amount of (A), based in each case on the total weight of the thixotropic agent (B) [wt %] | Amount of (B), based in each case on the total weight of the binder (C) [wt %] | Sagging limit [μm] |
| --- | --- | --- | --- | --- |
| CZ14 | — | — | 4.5 | <550 |
| CZ13 | C1* | 40 | 4.5 | 650 |
| Z38 | K1 | 40 | 4.5 | 850 |
| Z39 | K3 | 40 | 4.5 | 900 |
| Z40 | K4 | 40 | 4.5 | 750 |
| Z41 | K13 | 40 | 4.5 | 850 |
| Z42 | K16 | 40 | 4.5 | 800 |
| Z43 | K17 | 40 | 4.5 | >1000 |
| Z44 | K24 | 40 | 4.5 | 950 |

TABLE 8-continued

| Inventive/ comparative example | Condensation product (A) | Amount of (A), based in each case on the total weight of the thixotropic agent (B) [wt %] | Amount of (B), based in each case on the total weight of the binder (C) [wt %] | Sagging limit [µm] |
|---|---|---|---|---|

*C1: as comparative example C1, example compound 8 from DE 3706860 A1 was used.

2.7 Comparative Example: Composition Comprising at Least One Epoxide-Based Resin as Binder (C)

This comparative example (CZ15) comprises an inventively employed condensation product (A), but no thixotropic agent (B) (not inventive).

To prepare the binder (C), 99.5 fractions of liquid epoxy resin blend (RIM R 1335: modified bisphenol A resin, molecular weight >700 g/mol, epoxide value: 5.6 mol/kg, from Momentive) are admixed with 0.5 fraction of BYK A-530 (deaerating agent, from BYK-Chemie) and incorporated using a Dispermat CV (toothed disk 2 cm, 1500 rpm) for 2 minutes (component M1).

100 fractions of an amine curing agent blend as curing agent (D) (CeTePox 1393-02H (mixture of isophoronediamine, m-xylylenediamine, benzyl alcohol, salicylic acid, and nonylphenol, H equivalent 93, from CTP GmbH)) are introduced in a mixing vessel. Added to this mixture subsequently as condensation product (A) is the compound K5 (0.2 fraction), which is incorporated for 2 minutes with the Dispermat CV, toothed disk 2 cm, 1500 rpm (component M2).

Moreover, a further corresponding comparative composition (CZ16) is produced without addition of K5, i.e., a comparative composition containing neither (A) nor (B).

100 parts of component M1 are in each case mixed thoroughly with 50 parts of component M2 in a beaker for 1 minute. The materials are applied and the sagging behavior is determined.

The sagging limit ascertained for both compositions CZ15 and CZ16 is <550 µm in each case. No differences are observed in the thixotropic properties of these comparative compositions. The results are set out in table 9.

TABLE 9

| Comparative example | Condensation product (A) | Thixotropic agent (B) | Sagging limit [µm] |
|---|---|---|---|
| CZ15 | K5 | — | <550 |
| CZ16 | — | — | <550 |

The invention claimed is:

1. A process comprising incorporating a thixotropy-increasing additive in a composition, wherein the thixotropy-increasing additive is at least one condensation product (A) in the form of a free compound or in the form of a salt of at least one acid, the at least one condensation product (A) obtained by reaction of (a1) with (a2);
wherein (a2) is at least one polyalkylenepolyamine which is capable of forming at least one imidazoline and/or tetrahydropyrimidine unit and which has at least two primary amino groups or at least one primary and at least one secondary amino group; and
wherein (a1) is selected from the group consisting of: a mixture of polymerized fatty acids comprising, based on 100 wt % of the mixture, at least 70 wt % and less than 100 wt % of at least one trimerized fatty acid and greater than 0 wt % and not more than 30 wt % of at least one dimerized fatty acid; a mixture of polymerized fatty acids comprising, based on 100 wt % of the mixture, at least 70 wt % and less than 100 wt % of at least one dimerized fatty acid and greater than 0 wt % and not more than 30 wt % of at least one trimerized fatty acid; and a reaction product (U) of at least two polymerized fatty acids selected from the group consisting of dimerized fatty acids, trimerized fatty acids and mixtures thereof, and at least one polyamine having at least two primary amino groups.

2. The process as claimed in claim 1, characterized in that the at least one condensation product (A) has a tertiary nitrogen content of from 0.5 to 20 wt %, based on the total weight of the at least one condensation product (A).

3. The process as claimed in claim 1, characterized in that the at least one condensation product (A) has an amine number in the range from 200 to 1000.

4. The process as claimed in claim 1, characterized in that the at least one condensation product (A) is prepared using at least 0.9 mol of (a2) per carboxylic acid group of (a1).

5. The process as claimed in claim 1, characterized in that (a1) is prepared using at least one at least monounsaturated aliphatic $C_{16}$-$C_{20}$ monocarboxylic acid.

6. The process as claimed in claim 1, characterized in that (a2) is a polyalkylenepolyamine of the general formula (I)

in which
m is 2 or 3,
n is 0, 1, 2, 3, or 4,
p is 1, 2, 3, 4, or 5, and
X is H if n is 0 or
X is $NH_2$ or OH if n is 1, 2, 3, or 4.

7. The process as claimed in claim 6, characterized in that the at least one condensation product (A) contains at least one imidazoline and/or tetrahydropyrimidine unit.

8. A composition comprising
(A) a thixotropy-increasing additive, which is at least one condensation product in the form of a free compound or in the form of a salt of at least one acid, the at least one condensation product obtained by reaction of (a1) with (a2);
(B) at least one thixotropic agent;
(C) at least one binder; and
(D) optionally at least one curing agent;
wherein (a1) is at least one polymerized fatty acid or at least one reaction product (U) of at least two polymerized fatty acids and at least one polyamine having at least two primary amino groups;
wherein (a2) is at least one polyalkylenepolyamine which is capable of forming at least one imidazoline and/or tetrahydropyrimidine unit and which has at least two primary amino groups or at least one primary and at least one secondary amino group;
wherein (B) is present in an amount of from 0.5 to 25 wt %, based on the total weight of (C); and
wherein (A) is present in an amount of from 10 to 100 wt %, based on the total weight of (B).

9. The composition as claimed in claim 8, characterized in that the thixotropic agent (B) is selected from the group consisting of non-organically modified fumed silica, hydrophobically modified fumed silica, and mixtures thereof.

10. The composition as claimed in claim 8, characterized in that the binder (C) is selected from the group consisting of epoxide-based resins, polyester-based resins, vinyl ester-based resins, poly(meth)acrylate-based resins, resins based on at least one (meth)acrylate copolymer, and polyurethane-based resins.

11. An adhesive, sealant, paint, coating material, adhesive resin, casting resin, synthetic marble, floor covering, polymer concrete, or fiber composite material, comprising the composition of claim 8.

* * * * *